United States Patent
Howard

(10) Patent No.: US 11,448,584 B2
(45) Date of Patent: Sep. 20, 2022

(54) QUICK RELEASE COUPON HOLDER SYSTEM

(71) Applicant: NCH Corporation, Irving, TX (US)

(72) Inventor: James William Howard, Juliette, GA (US)

(73) Assignee: NCH Corporation, Irving, TX (US)

( * ) Notice: Subject to any disclaimer, the term of this patent is extended or adjusted under 35 U.S.C. 154(b) by 0 days.

(21) Appl. No.: 17/391,733

(22) Filed: Aug. 2, 2021

(65) Prior Publication Data

US 2022/0034787 A1 Feb. 3, 2022

Related U.S. Application Data

(60) Provisional application No. 63/060,433, filed on Aug. 3, 2020.

(51) Int. Cl.
*G01N 17/04* (2006.01)

(52) U.S. Cl.
CPC .................................. *G01N 17/046* (2013.01)

(58) Field of Classification Search
CPC ..... G01N 17/04; G01N 17/043; G01N 17/046
See application file for complete search history.

(56) References Cited

U.S. PATENT DOCUMENTS

| | | |
|---|---|---|
| 4,002,059 A | 1/1977 | Jeffers et al. |
| 4,120,313 A | 10/1978 | Lewis |
| 4,501,323 A | 2/1985 | Lively et al. |
| 4,603,113 A * | 7/1986 | Bauer ................... G01N 17/00 422/53 |
| 4,605,065 A * | 8/1986 | Abercrombie ......... E21B 47/00 166/902 |
| 4,688,638 A * | 8/1987 | Williams ............... E21B 41/02 166/902 |
| 4,928,760 A * | 5/1990 | Freitas ................ E21B 47/017 166/902 |
| 5,095,977 A * | 3/1992 | Ford ..................... E21B 47/017 422/53 |
| 5,895,870 A | 4/1999 | Montana |
| 7,096,721 B2 | 8/2006 | Bennett |
| 8,561,458 B2 * | 10/2013 | Macuch ............... G01N 17/046 137/268 |

(Continued)

FOREIGN PATENT DOCUMENTS

CN 2553372 5/2003

*Primary Examiner* — Natalie Huls
(74) *Attorney, Agent, or Firm* — Scheef & Stone, LLP; Robin L. Barnes

(57) ABSTRACT

A quick release corrosion coupon holder system comprising a shaft and a clip configured to pivot between open and closed positions to securely hold an end of a corrosion coupon. Preferably, no nuts, bolts, or removable parts are required to install or remove a coupon from the holder. Preferably a spring is disposed between the shaft and clip with one or more attached legs or a separate pin configured to secure the clip to the shaft and act as a fulcrum. An optional inwardly extending projection may be inserted through an aperture on the coupon. An optional spacer creates a gap between the shaft and clip to accommodate the thickness of a coupon. Preferably a lip and shoulder pair on the clip and an opposing lip and shoulder pair on the shaft contact front and back surfaces of the coupon, limiting contact surface area between the holder and coupon.

32 Claims, 19 Drawing Sheets

(56) References Cited

U.S. PATENT DOCUMENTS

| | | | |
|---|---|---|---|
| 8,646,487 B2* | 2/2014 | Thompson | G01N 17/043 138/94 |
| 9,033,036 B2* | 5/2015 | Wilkinson | E21B 47/00 166/113 |
| 9,360,467 B1* | 6/2016 | Van Orsdol | G01N 33/225 |
| 10,914,161 B2* | 2/2021 | Pietravalli | E21B 49/08 |
| 11,041,378 B2 | 6/2021 | Chen et al. | |
| 11,268,897 B2* | 3/2022 | Nicolino | E21B 43/127 |
| 2017/0226843 A1* | 8/2017 | Jovancicevic | G01N 17/046 |
| 2018/0024044 A1* | 1/2018 | Ringgenberg | E21B 47/00 73/86 |

* cited by examiner

Side A of Prior Art Holders
Copper
Side A of Holder 10
Copper
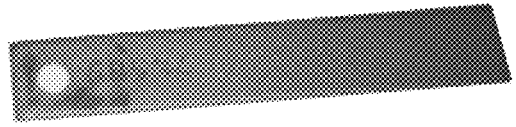
Mild Steel
Mild Steel
FIG. 6
Side B of Prior Art Holders
Copper
Side B of Holder 10
Copper
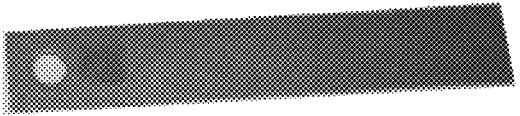
Mild Steel
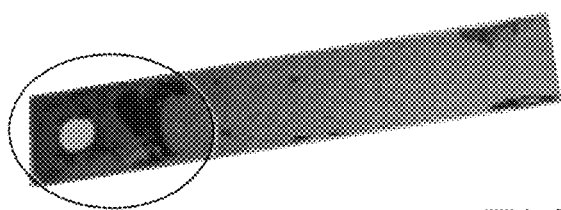
Mild Steel
FIG. 7

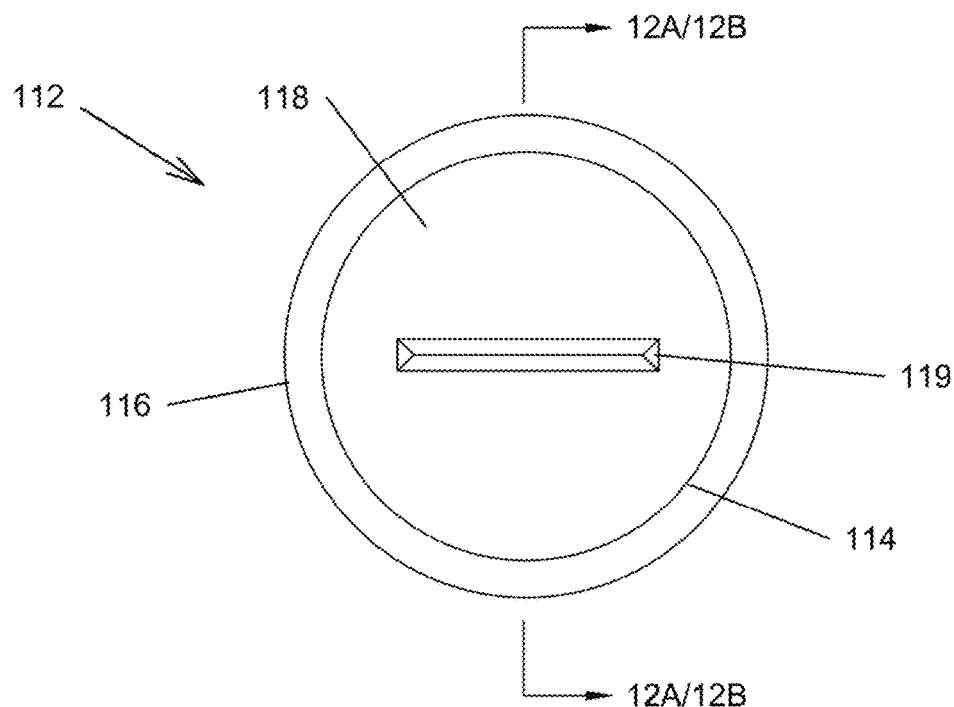
FIG. 10
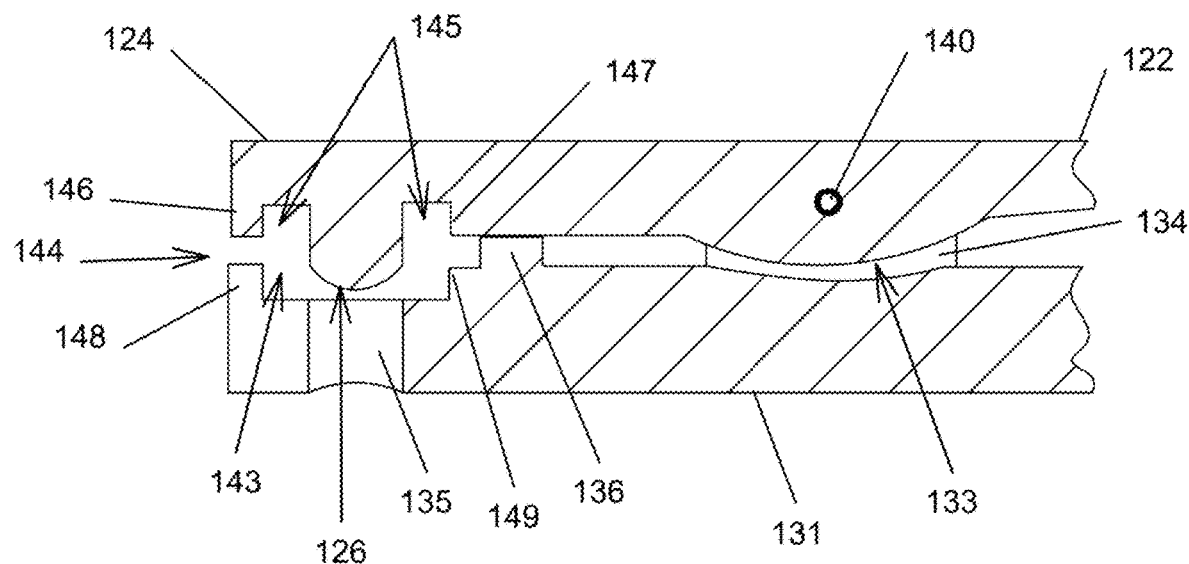
FIG. 11-B

FIG. 11-A

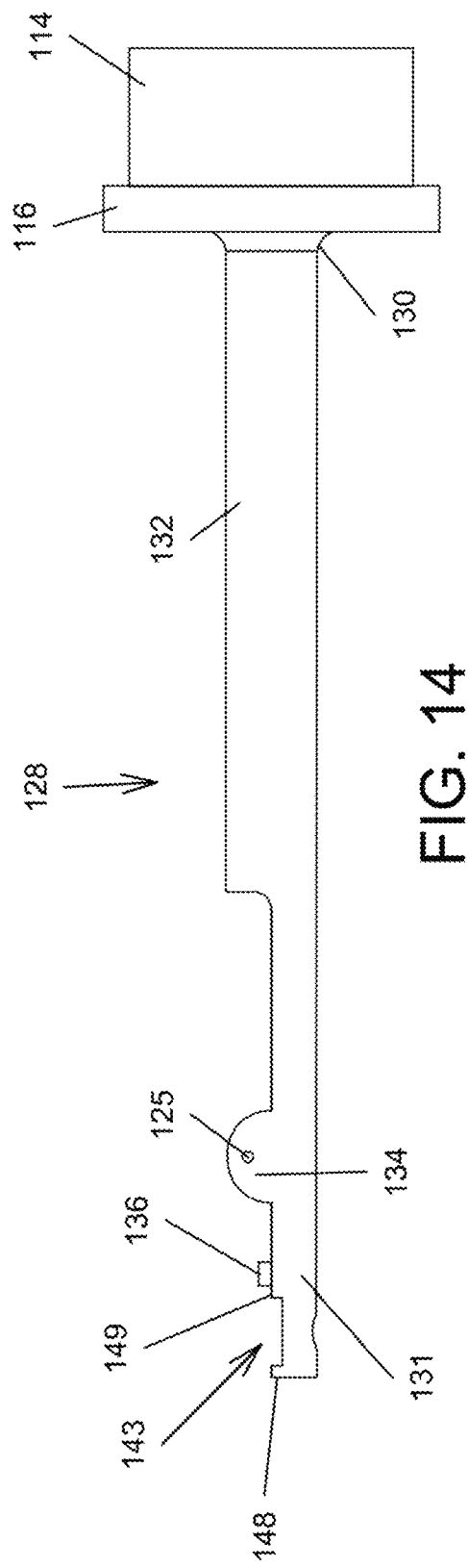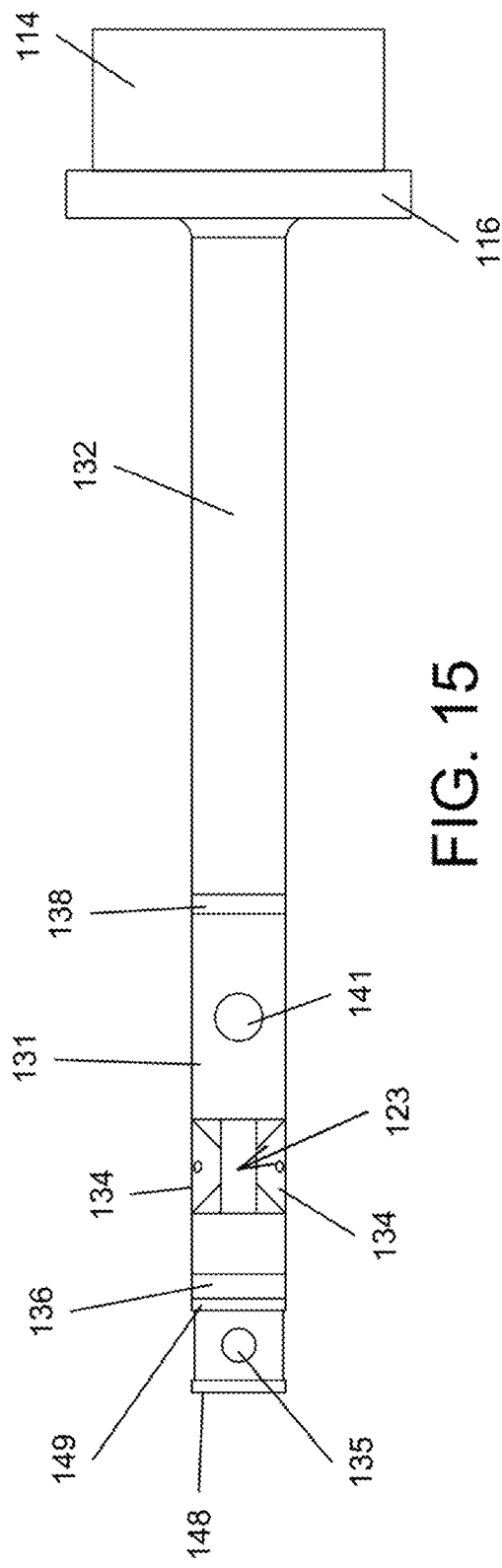

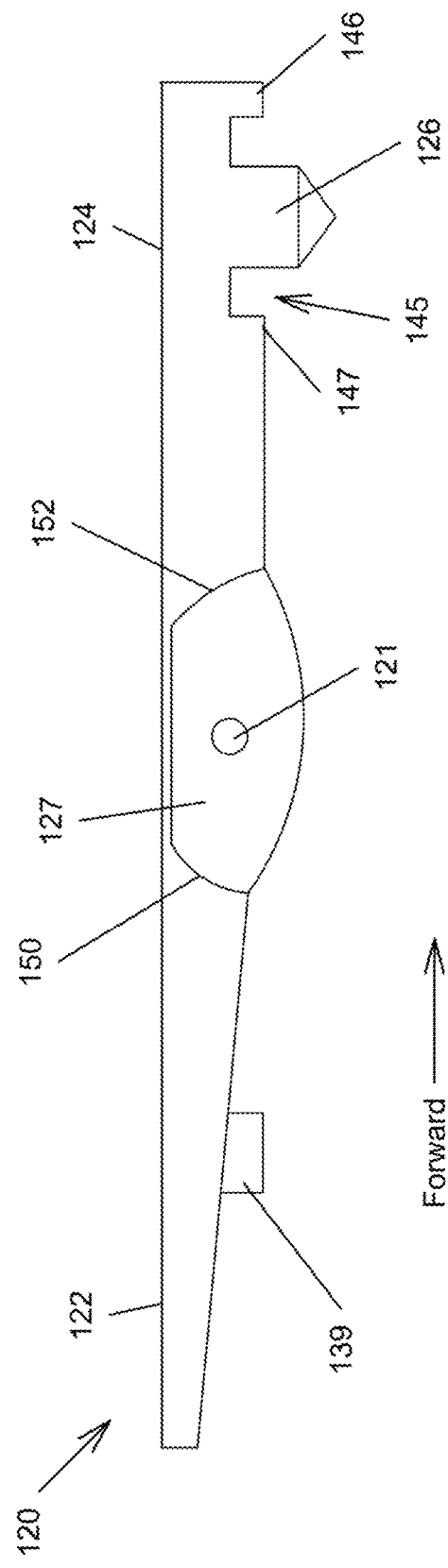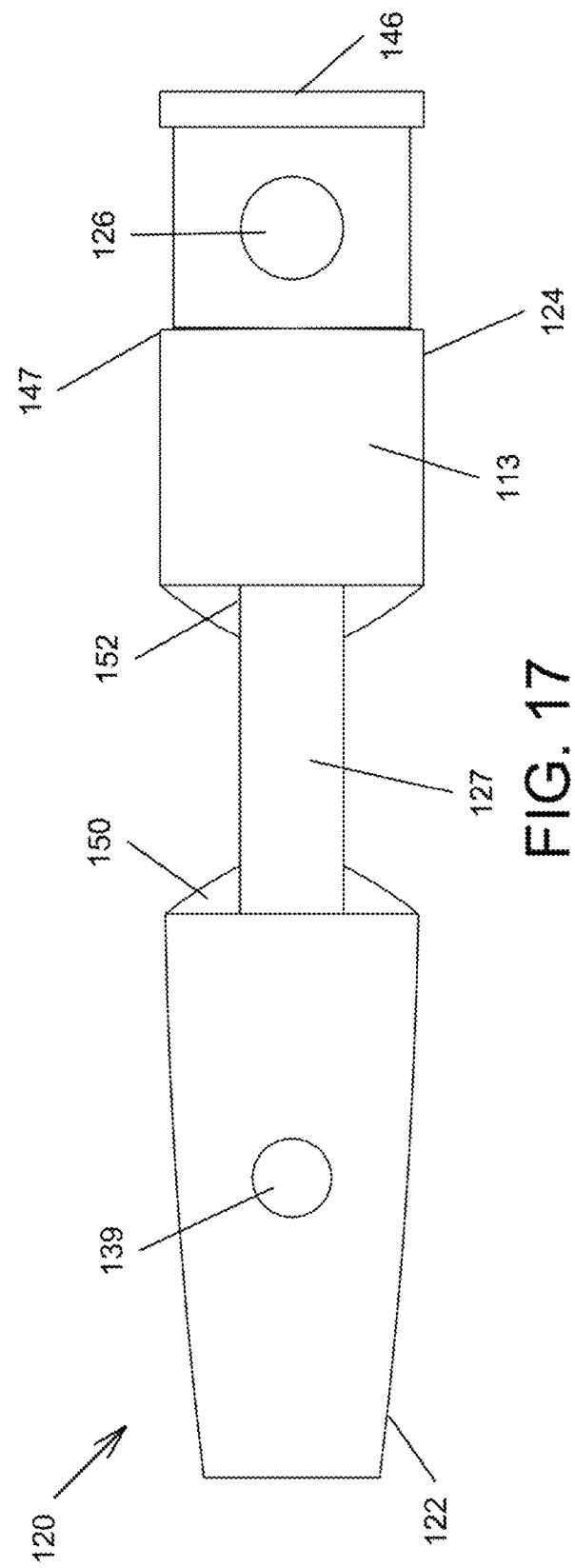

QUICK RELEASE COUPON HOLDER SYSTEM

CROSS-REFERENCE TO RELATED APPLICATION

This application claims the benefit of U.S. Provisional Application Ser. No. 63/060,433 filed on Aug. 3, 2021.

BACKGROUND OF THE INVENTION

1. Field of the Invention

This invention relates to a coupon holder system for holding metal coupons used in measuring corrosion rates in fluid systems that allows a coupon to be quickly and easily removed from the holder and replaced with a new coupon when a measuring cycle is complete by using a pivoting clip and without requiring removal of any nuts, bolts, or other parts to secure or remove the coupon from the holder.

2. Description of Related Art

Various types of fluid systems, particularly water systems such as open recirculating systems, closed loop cooling or heating systems, cooling towers and boilers, contain metal components that are susceptible to corrosion. The metals typically used in these water systems include ferrous metals, including galvanized steel, aluminum and its alloys, copper and its alloys, lead, and solder. Corrosion rates are frequently measured by using one or more metal coupons that are submerged in the water from the fluid system for a period of time, then removed to determine a rate of corrosion, generally measured in mils/year or MPY, based on metal weight loss from the clean coupon at the beginning of the test cycle to the corroded coupon at the end of the test cycle. Multiple coupons holders are frequently used in a corrosion coupon rack through which a side stream from the water system is directed to flow over each of the coupons (one per holder) before the water is returned to the water system.

Prior art coupon holders, like that disclosed in U.S. Pat. No. 7,096,721, comprise an elongated metal body or shaft with a recessed area having an aperture at one end. A coupon, which is a thin, rectangular metal strip with an aperture in one end, is placed on the recessed area so that the coupon aperture is aligned with the holder aperture. The forward end of the coupon (distal from the aperture) extends beyond the forward end of the holder to be in free contact with the water flowing through the pipe in the coupon rack in which the holder and coupon are inserted. A bolt is inserted through the aligned apertures and secured with a nut to hold the coupon to the coupon holder.

Although there have been advances in ease of removing the holder from the corrosion coupon rack, including the use of threaded couplers, the nut and bolt mechanism for securing the coupon the holder has not changed in decades. When it is time to remove the coupons for analysis after a test cycle and replace them with a new coupon, a user or technician has to remove each holder from the rack, unscrew the nut from the bolt, remove each coupon, replace each coupon, align the apertures, insert the nut, and secure the new coupons with the bolt. It is a time consuming process and can be difficult to do without dropping the coupon, the nut, and/or the bolt, particularly when they are frequently wet. There is a need for a coupon holder with a new, quick release attachment mechanism that will save time and avoid the hassle of trying to align multiple removable parts to secure the coupon.

SUMMARY OF THE INVENTION

According to one preferred embodiment of the invention, an improved coupon holder comprises a shaft and a clip configured to pivot between an open position and a closed position relative to the shaft. When in the open position, the coupon holder allows an old coupon to be removed and a new coupon to be inserted between the clip and shaft. When in the closed position, the coupon holder securely holds a first end of the coupon with the distal end of the coupon extending forwardly from the holder. Most preferably, no nuts, bolts, or other removable parts are required to secure the coupon to the holder or release the coupon from the holder. Most preferably, no nuts, bolts, or other removable parts are required to move the holder or the clip between the opened and closed positions.

According to another preferred embodiment, a coupon holder further comprises a pin inserted through a portion of the shaft and a portion of the clip to secure the clip to the shaft while allowing pivoting motion of the clip relative to the shaft. According to another preferred embodiment, the clip comprises a pivot body having an aperture to receive a pin and the shaft comprises a clip holder configured to receive the pivot body and act as a fulcrum for the clip. According to another preferred embodiment, the clip holder comprises two bodies spaced apart laterally from each other and forming an opening configured to receive the pivot body, with each clip holder body comprising an aperture that aligns with the aperture on the pivot body to receive the pin.

According to another preferred embodiment, a coupon holder further comprises a spring disposed between the shaft and the clip. According to another preferred embodiment, the spring is a vertically disposed compression spring extending between the shaft and clip and is in an extended (or uncompressed) position when the clip is in the closed position and the spring is in a compressed position when the clip is in the open position. According to another preferred embodiment, the shaft or the clip further comprises a recess configured to receive a first end of the spring and the other of the shaft or the clip further comprises a retaining projection extending inwardly and configured to be inserted into a second end of the spring. According to another preferred embodiment, the shaft and clip both further comprise a recess, one of which is configured to receive a first end of the spring and the other of which is configured to receive a second end of the spring. According to another preferred embodiment, the shaft and clip both further comprise an inwardly extending retaining projection, one of which is configured to be inserted into a first end of the spring and the other of which is configured to be inserted into a second end of the spring.

According to another preferred embodiment, the spring is a torsion spring disposed laterally between the shaft and clip or other spring similar to that used in a clothespin. Most preferably, the clip and shaft contain recesses or apertures configured to receive the coil of the torsion spring and the legs extending from the coil to provide the pivoting motion of the clip when compressed by a user and the force to hold the clip in a closed position when a user is not applying any force to the clip. According to another preferred embodiment, a hinged wedge or lever is disposed between the clip and the shaft that can be rotated between a first position in which the clip is held in a closed position and a second position in which the clip is openable. Most preferably, the hinged end of the wedge or lever is attached to the clip or the shaft and the other of the clip or the shaft comprises a recess or a lip configured to hold an end of the wedge or lever distal from the hinge in the first position until a user provides a force to move the wedge or lever to the second position. According to another preferred embodiment, a wedge or lever disposed between the shaft and the clip may be slidably moveable between the first position and the second position. According to another preferred embodiment, a forward portion of the clip and a forward portion of the shaft may both move away or pivot away from each other when a force is applied to an actuator, such as a spring, wedge, or lever, to open the holder for insertion or removal of a coupon with a rear portion of the shaft remaining stationary, as will be understood by those of ordinary skill in the art.

According to another preferred embodiment, the shaft or the clip further comprises an inwardly extending spacer that abuts an inner surface of the other of the shaft or clip to form a coupon insertion area between the clip and the shaft when the holder (or clip) is in the closed position. Most preferably, the spacer is sized to create a gap or coupon insertion area between the clip and shaft when the holder (or clip) is in the closed position that is substantially equal to the thickness of a coupon to be used with the coupon holder.

According to another preferred embodiment, the shaft or the clip further comprises an inwardly extending coupon engagement projection configured to be inserted into an aperture on the first end of the coupon. The optional coupon engagement projection aids in aligning and securing the coupon to the holder when in a closed position. According to another preferred embodiment, an inward end of the coupon engagement projection comprises a pointed or tapered end. According to another preferred embodiment, the other of shaft or the clip further comprises an aperture or recess configured to receive a portion of the coupon engagement projection when the holder (or clip) is in the closed position.

According to another preferred embodiment, the holder comprises a coupon engagement projection and a spacer, with the coupon engagement projection disposed forwardly of the spacer. Most preferably, one of the spacer and the coupon engagement projection is disposed on the shaft and the other is disposed on the clip. According to another preferred embodiment, the holder comprises a coupon engagement projection, a spacer, and a spring, with the coupon engagement projection disposed forwardly of the spacer and the spring disposed rearwardly of the spacer.

According to another preferred embodiment, the holder further comprises a pair of opposed spaced apart lips, one on a forward portion of the shaft and the other on a forward portion of the clip and a pair of opposed spaced apart shoulders, one on the on the forward portion of the shaft and the other on the forward portion of the clip. In this preferred embodiment, the lips and shoulders are configured to engage with front and rear surfaces of a corrosion coupon to secure the coupon in the holder with minimum contact between the holder and the coupon. Most preferably, the pair of lips and the pair of shoulders are spaced apart from each other longitudinally (in a direction from a front of the holder to the rear of the holder) by around 0.375 to 0.500 inches. Most preferably, a vertical distance of a gap formed between the spaced apart lips and between the spaced apart shoulders when the holder (or clip) is in the closed position (a coupon insertion area) is substantially equal to the thickness of the coupon. According to another preferred embodiment, the holder also comprises a coupon engagement projection and a spacer, with the pair of lips disposed forwardly of the coupon engagement projection and the pair of shoulders disposed rearwardly of the coupon engagement projection and forwardly of the spacer. Most preferably, when a corrosion coupon is placed in the coupon insertion area and the holder (or clip) is in a closed position, the corrosion coupon does not contact any portion of the holder other than inner facing surfaces of the lips and shoulders, a forward facing surface of the spacer, and/or a portion of the coupon engagement projection inserted through the aperture in the coupon.

According to another preferred embodiment, a forward portion of the shaft comprises a recessed area configured to receive the clip. Most preferably, a rearward portion of the shaft has a height that is substantially the same as the combined height of the recessed area of the forward portion of the shaft and the clip and any gap formed between the forward portion of the shaft and the clip by a spacer or similar projection to create a coupon insertion area.

According to another preferred embodiment, a rearward portion of the clip is tapered relative to a forward portion of the clip. Most preferably, the rearward portion is disposed at an angle of around 80 to 85 degrees relative to an axis substantially perpendicular to inner surface of the forward portion of the clip. According to another preferred embodiment, the pivot body is disposed between the forward and rearward portions of the clip and comprises an inwardly extending arcuate body. Most preferably, at least a portion of the pivot body has a height that is greater than a maximum height of the forward portion of the clip and greater than a maximum height of the rearward portion of the clip.

According to another preferred embodiment, a holder further comprises a cap disposed rearwardly of the shaft. Most preferably, the cap comprises a cylindrical body, a flange, and a rear face. Most preferably, the cylindrical body is configured to extend through an aperture in a nut and the flange is configured to engage with an inner shoulder of the nut and/or a recess in a socket end that is used to secure the holder in a coupon rack so that the clip and at least a portion of the shaft are inserted into a pipe in the coupon rack and at least a portion of the cylindrical body is accessible outside of the pipe (or from an exterior of the pipe). According to another preferred embodiment, the cap further comprises an alignment indicator on the rear face of the cap, wherein the alignment indicator indicates the position of a coupon attached to the holder within the pipe of the coupon rack.

According to one preferred embodiment, a method of installing and/or removing a coupon from a coupon holder comprises the following steps: (1) providing a coupon holder comprising a shaft and a clip configured to pivot between an open position and a closed position relative and configured to securely hold a first end of a corrosion coupon when the holder is in the closed position with a distal end of the coupon extending forwardly from the holder; (2)(a) applying a force on a rear end of the clip to cause a forward end of the clip to move away from the shaft, placing the holder (or clip) in the open position or (b) moving a wedge or lever from a first position in which the clip is held in a closed position to a second position to cause a forward end of the clip to move away from the shaft, placing the holder (or clip) in the open position; (3) removing any existing coupon disposed between the clip and the shaft; (4) optionally inserting a new coupon between the clip and the shaft; and (5)(a) releasing the force on the rear end of the clip to cause the forward end of the clip to move toward to the shaft, placing the holder (or clip) in the closed position or (b) moving the wedge or lever back to the first position, placing the holder (or clip) in the closed position.

According to another preferred embodiment, step (4) further comprises (a) aligning an aperture in the first end of the coupon with an inwardly extending coupon engagement projection disposed on the shaft or the clip; and/or (b) abutting a rear face of the first end of the coupon to an inwardly extending spacer disposed on the shaft or the clip.

According to another preferred embodiment of installing and/or removing a coupon from a coupon holder for use in a coupon rack, the method further comprises the following steps: (5) shutting off flow of water or other fluid to the coupon rack; (6) loosening any connections between a nut, socket, and/or tee-coupler as needed to remove the coupon holder of step 1 from the coupon rack; (7) carrying out steps 2-5 above to remove an old coupon and optionally install a new coupon in the holder; (8) reinserting the coupon holder into the coupon rack, preferably so that any coupon and at least a portion of the shaft of the holder are disposed inside a pipe in the coupon; (9)(a) optionally viewing the position of an alignment indicator on a rear end of the holder that extends outwardly of the coupon rack pipe and the nut used to secure to the holder to the coupon rack to ensure that the coupon's width is aligned vertically in the pipe and (b) optionally rotating the holder until the alignment indicator indicates the coupon is aligned vertically in the pipe; (10) re-tightening all connections that were loosened in step 6; and (11) turning on flow of water or other fluid to the coupon rack. Certain connections may be re-tightened in step 10 before carrying out other steps, but it is most preferred that the nut securing the holder to the coupon rack not be re-tightened until optional step 9 is completed. These steps are periodically repeated at the end of a test cycle so that corroded coupons may be removed and tested to determine corrosion rate of the water or fluid system, with new coupons optionally being installed to start a new test cycle.

Most preferably, the coupon holder used in the preferred methods of the invention is a holder one according to one of the preferred embodiments of the invention.

According other preferred embodiments, a coupon holder comprises any combination of features of the above-described preferred embodiments and a method of installing and removing a coupon comprises any combination of features and steps of the above-described preferred embodiments. Coupon holders according to preferred embodiments of the invention have the advantage of being easier and faster to use than prior art nut and bolt coupon holders, the parts of the holder are preferably all interconnected and it is preferred that a coupon may be secured to or removed from the holder without requiring any parts to be removed from the holder, unlike the prior art nut and bolt holders.

BRIEF DESCRIPTION OF THE DRAWINGS

The system of the invention is further described and explained in relation to the following figures wherein:

FIG. 5-B is a reduced scale view of FIG. 5-A showing an angle for a portion of a clip body;

FIG. 6 contains photographs showing the corrosion on Side A of the coupons referenced in Table 1 with the prior art coupon holder on the left and coupon holder 10 on the right, copper coupons on top and mild steel coupons on the bottom;

FIG. 7 contains photographs showing the corrosion on Side B of the coupons referenced in Table 1 with the prior art coupon holder on the left and coupon holder 10 on the right, copper coupons on top and mild steel coupons on the bottom;

FIG. 8-B is a photograph showing corrosion on the surfaces of the forward portion of the coupon holder of FIG. 3 as shown in FIG. 8-A in contact with the coupon for the holder in the tests referenced in Table 1;

FIG. 10 is a rear end elevation view of the coupon holder of FIG. 9;

FIG. 11-B is a close up cross sectional view of the forward end of the holder in FIG. 11-A;

FIG. 14 is a side elevation view of a shaft and rear cap portions of the coupon holder of FIG. 9;

FIG. 15 is a top plan view of the shaft portion and rear cap portion of FIG. 14;

FIG. 16 is a side elevation view of a clip portion of the coupon holder of FIG. 9;

FIG. 17 is a bottom plan view of the clip portion of FIG. 16;

DESCRIPTION OF PREFERRED EMBODIMENTS

Figure 1:
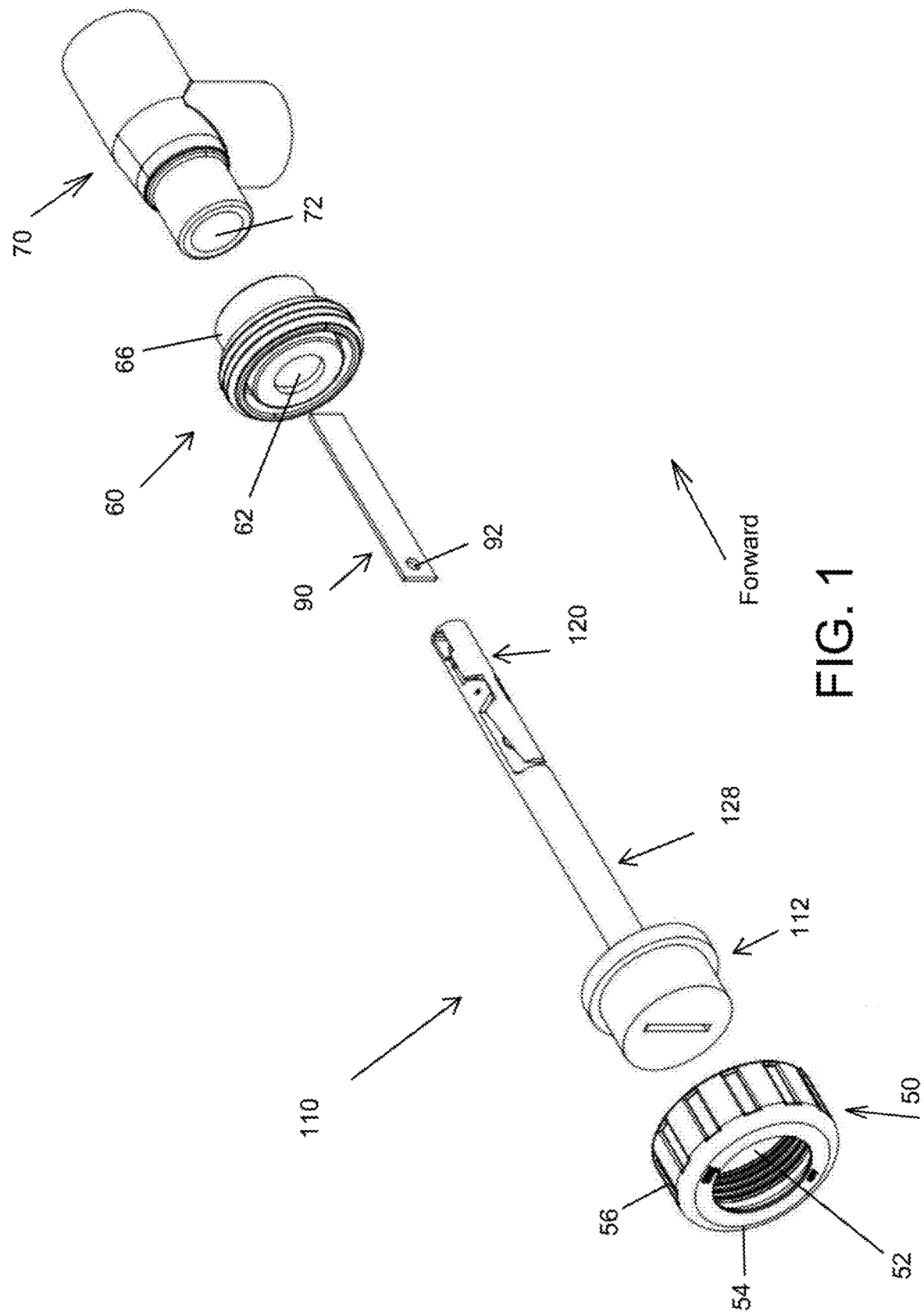
FIG. 1 is an exploded perspective view of a coupon holder according to a preferred embodiment of the invention, along with components to connect the holder to a coupon rack.
Figure 2:
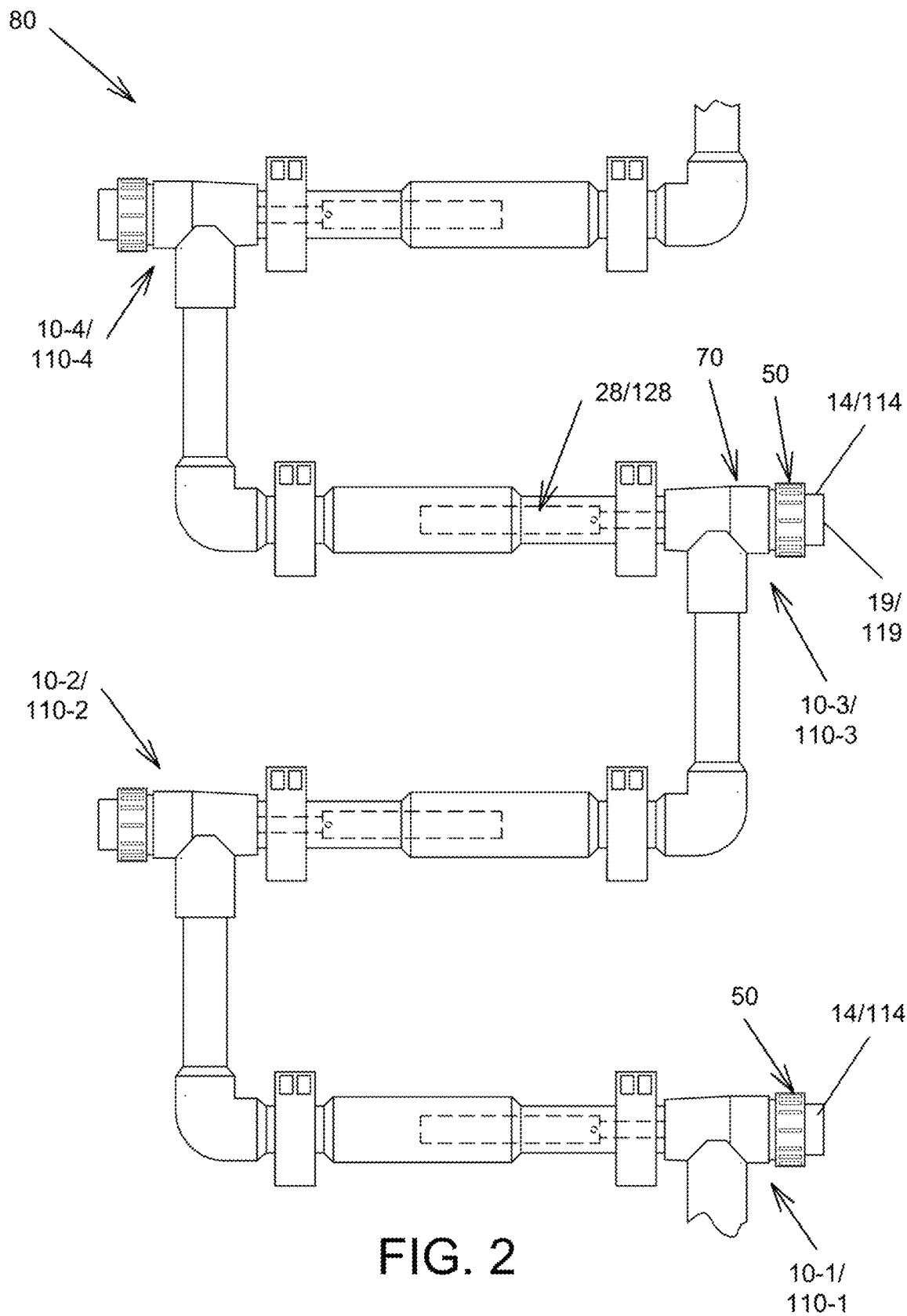
FIG. 2 is a perspective view of a coupon rack with multiple coupon holders of FIG. 1 installed.
Figure 3:
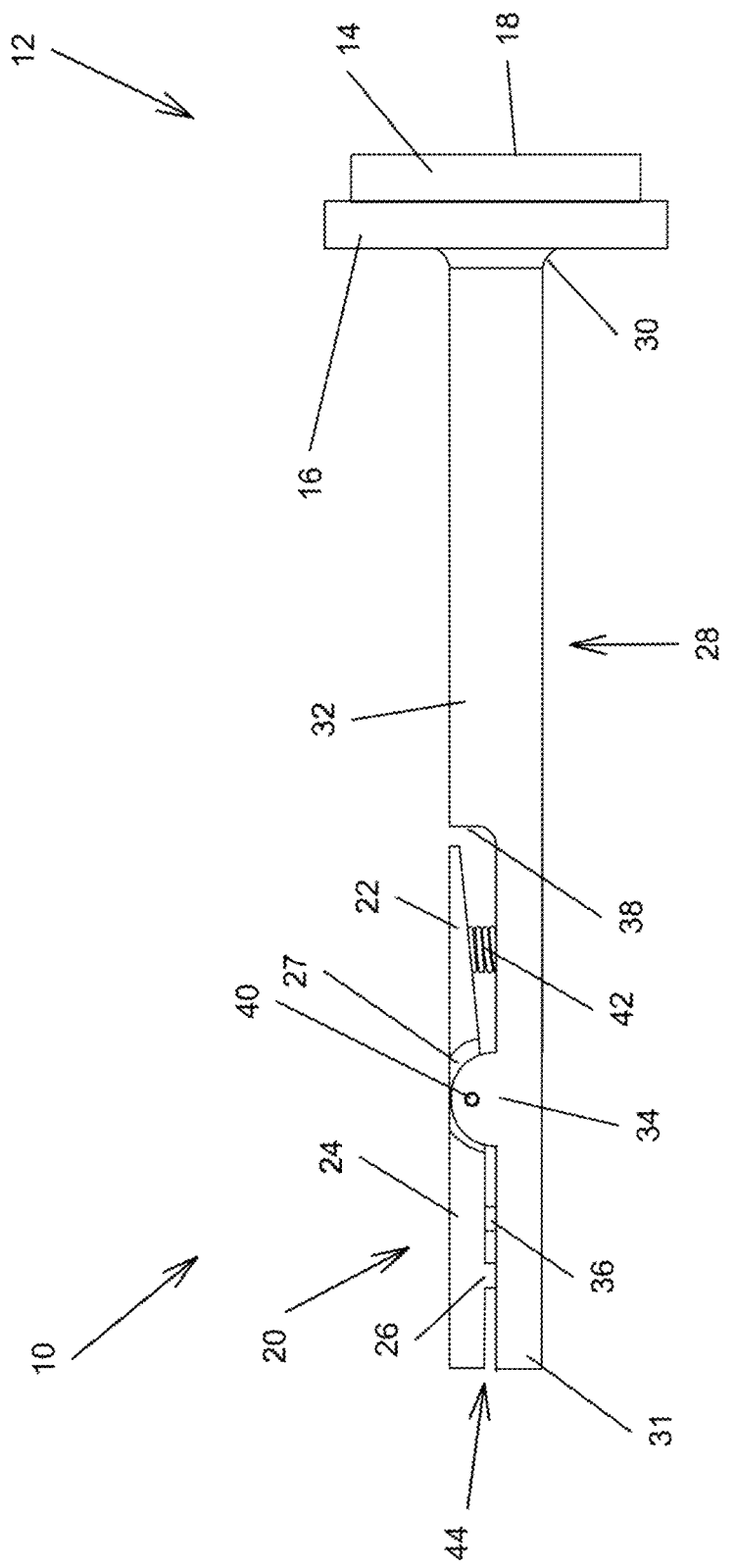
FIG. 3 is a side elevation view of the coupon holder according to a another preferred embodiment of the invention.
Figure 4:
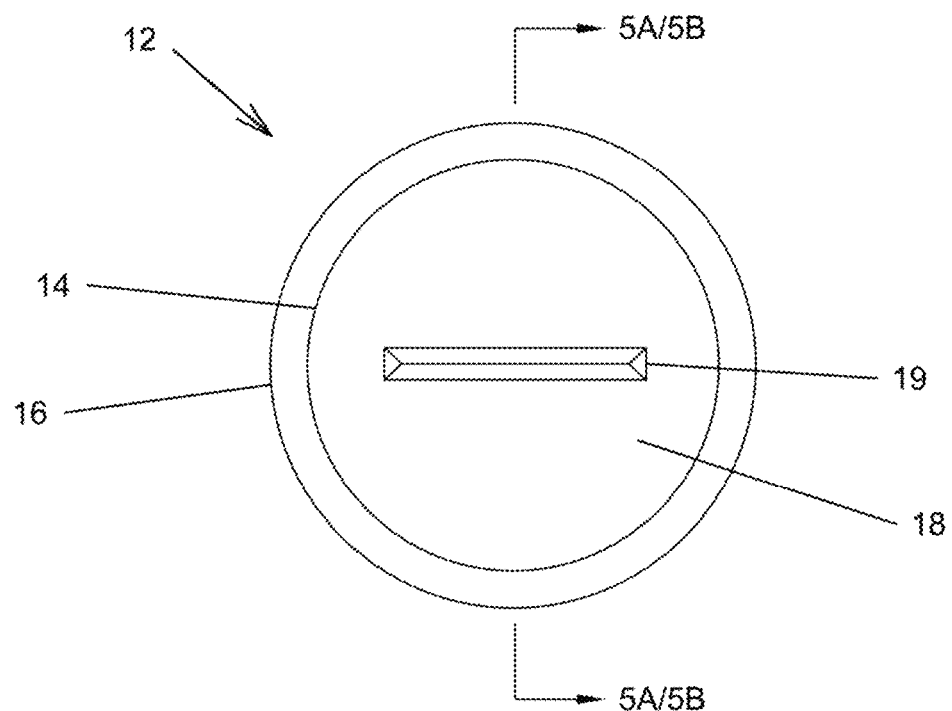
FIG. 4 is a rear end elevation view of the coupon holder of FIG. 3.

Quick release coupon holders 10 and 110 according to preferred embodiments of the invention are shown in FIGS. 1-3 and 10. Most preferably one or more holders 10 or 110 are used with a coupon rack 80, which is similar to that shown in FIG. 1 of U.S. Pat. No. 7,096,721 and such racks are well-known in the art. Rack 80 allows multiple coupon holders, such as holders 10-1, 10-2, 10-3, and 10-4 (for example), to be inserted into piping through which a side stream from a water system being tested passes. Rack 80 preferably comprises one or more valves to allow water through the rack to be temporarily shut-off to allow the holders 10 or 110 to be removed, so that a coupon 90 in each holder can be removed for analysis at the end of a test cycle and replaced with a new coupon for use in the next test cycle. Each coupon holder 10 or 110 is preferably used with a tee-coupler 70, a socket 60, and a nut 50 to allow holder 10 or 110 to be inserted into a pipe in coupon rack 80 and sealed in place during a test cycle. These types of connections for a coupon holder are also well-known in the art.

Referring to FIGS. 3-8-A, a coupon holder 10 according to one preferred embodiment of the invention is shown. Coupon holder 10 preferably comprises a rear cap 12, a clip 20, a shaft 28, a pin 40, and a spring 42. Rear cap 12 preferably comprises a rear cylindrical body 14, a flange 16, a rear surface 18, and a coupon alignment indicator 19. Cylindrical body 14 is preferably sized to fit through an aperture in a nut 50 (such as aperture 52 shown in FIG. 1) so that cylindrical body 14 extends rearwardly of nut 50. Flange 16 is preferably sized to be inserted into a body of nut 50. A coupon alignment indicator 19 is preferably disposed on rear surface 18 as further described below.

Shaft 28 is preferably disposed forwardly of rear cap 12 and comprises a forward portion or forward shaft body 31 and rear portion or rear shaft body 32. A shoulder 30 preferably joins a rear portion 32 to flange 16. Rear portion 32 is preferably cylindrical, but may also be rectangular or have another shape. A shoulder 38 is formed between rear portion 32 and forward portion 31 to provide a recessed area in shaft 28 to receive clip body 20. Most preferably, a radius or height of forward portion 31 is around 50% of the radius or height of rearward portion 32 to form the recess for clip 20. Forward portion 31 preferably comprises a spacer 36 and a recess 41 configured to receive spring 42. Spacer 36 preferably comprises a raised lip protruding inwardly from shaft forward portion 31. Spacer 36 also preferably acts as a rear stop for a coupon inserted into holder 10, such that a rearward edge of the coupon would abut a forward surface of spacer 36, as further described below. Spacer 36 preferably creates a gap or coupon insertion area 44 between clip forward portion 24 and shaft forward portion 31. The height of coupon insertion area 44 is preferably substantially equal to the thickness of a coupon 90 that will be used with holder 10. Shaft forward portion 31 also preferably comprises an optional recess or aperture 35 configured to receive an inner end portion of coupon engagement projection 26 when coupon holder 10 (or clip 24) is in a closed position. Forward portion 31 also preferably comprises a clip holder 34. Clip holder 34 preferably comprises two spaced apart bodies forming an opening between them that is configured to receive a pivot area or pivot body 27 on clip body 20. Each of the spaced apart bodies of clip holder 34 comprises an aperture configured to receive pin 40. Clip holder 34 and pin 40 preferably act as a fulcrum to support clip 20 and allow it to pivot between open and closed positions according to one preferred embodiment.

Clip body 20 preferably comprises a forward end or forward clip body 24, a rearward end or rearward clip body 22, and a pivot area or pivot body 27 disposed between forward portion 24 and rearward portion 22. Forward clip portion 24 preferably comprises a coupon engagement projection 26 extending inwardly toward shaft forward portion 31 for engaging with aperture 92 in coupon 90. Most preferably, projection 26 is cylindrical and comprises a pointed or tapered end as shown on FIG. 5-A to aid in aligning aperture 92 with projection 26, but other shapes, such as a cylinder with a flat end or rounded end, may also be used. Rearward clip portion 22 is preferably tapered in thickness relative to forward clip portion 24. Forward clip portion 24 is preferably around 0.18 to 0.20 inches high and rearward clip portion 22 is preferably around 0.18 to 0.20 inches high at its maximum height (near pivot body 27) and preferably around 0.060 to 0.065 inches at its minimum height (at its rear-most end) (these heights measured in a direction parallel to axis 11 in FIG. 5-A). Rearward portion 22 preferably comprises a spring retaining projection 39 that extends inwardly toward forward shaft portion 31. Retaining projection 39 is preferably cylindrical and sized to receive an end of spring 42 around an exterior surface of retaining projection 39 to aid in holding spring 42 in position between clip 20 and shaft 28. Spring 42 is preferably a stainless steel spring, but other materials that are resistant to corrosion, may also be used. Preferably, spring 42 has an outside diameter range of 0.20 to 0.25 and a length of 0.45 to 0.55. Most preferably spring 42 has an outside diameter of around 0.25 inches and a length of around 0.5 inches, but other sizes may also be used. Spring 42 is preferably rated to around 14.5 to 15.5 lbs/in. A spring having the rating of spring 142, discussed below, may also be used with coupon holder 10.

Figure 5B:
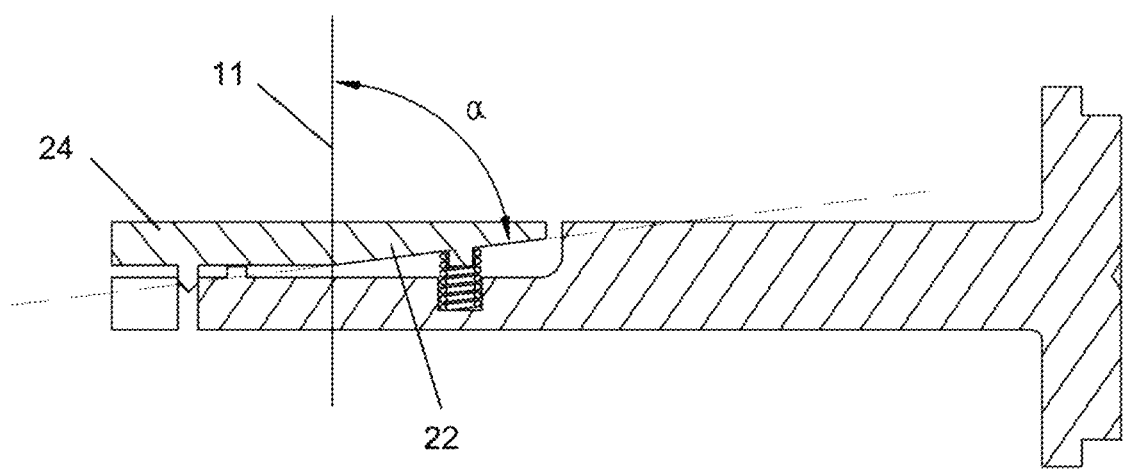
FIG. 5-A is a cross sectional elevation view of the coupon holder of FIG. 3.

Pivot area 27 is disposed around aperture 21 and preferably comprises an angular or slightly arcuate transition between forward clip portion 24 and rearward clip portion 22. As shown FIG. 8-A, an inner surface of pivot area 27 is narrower than adjacent portions of clip portion 22 and clip portion 24 to allow pivot area 27 to be inserted into area 33 between the two bodies of clip holder 34 (similar to area 123 between clip holder bodies 134 on FIG. 15). As shown in FIG. 5-B, an inner surface of rear clip portion 22 is preferably disposed at an angle $\alpha$ of around 84° to 85°, most preferably around 84.5° relative to an axis 11 that is perpendicular to an inner surface of clip forward portion 24. An aperture 21 is disposed through pivot area 27 to align with the apertures on the bodies of clip holder 34. Aperture 21 is configured to receive pin 40 to pivotally connect clip 20 to shaft 28. Pin 40 is preferably a stainless steel pin having a diameter of around 0.060 to 0.066 inches, more preferably around 0.620-0.625 inches, and a length of around 0.43-0.44 inches, more preferably around 0.4375 inches, but other suitable materials and sizes may also be used.

Figure 11:
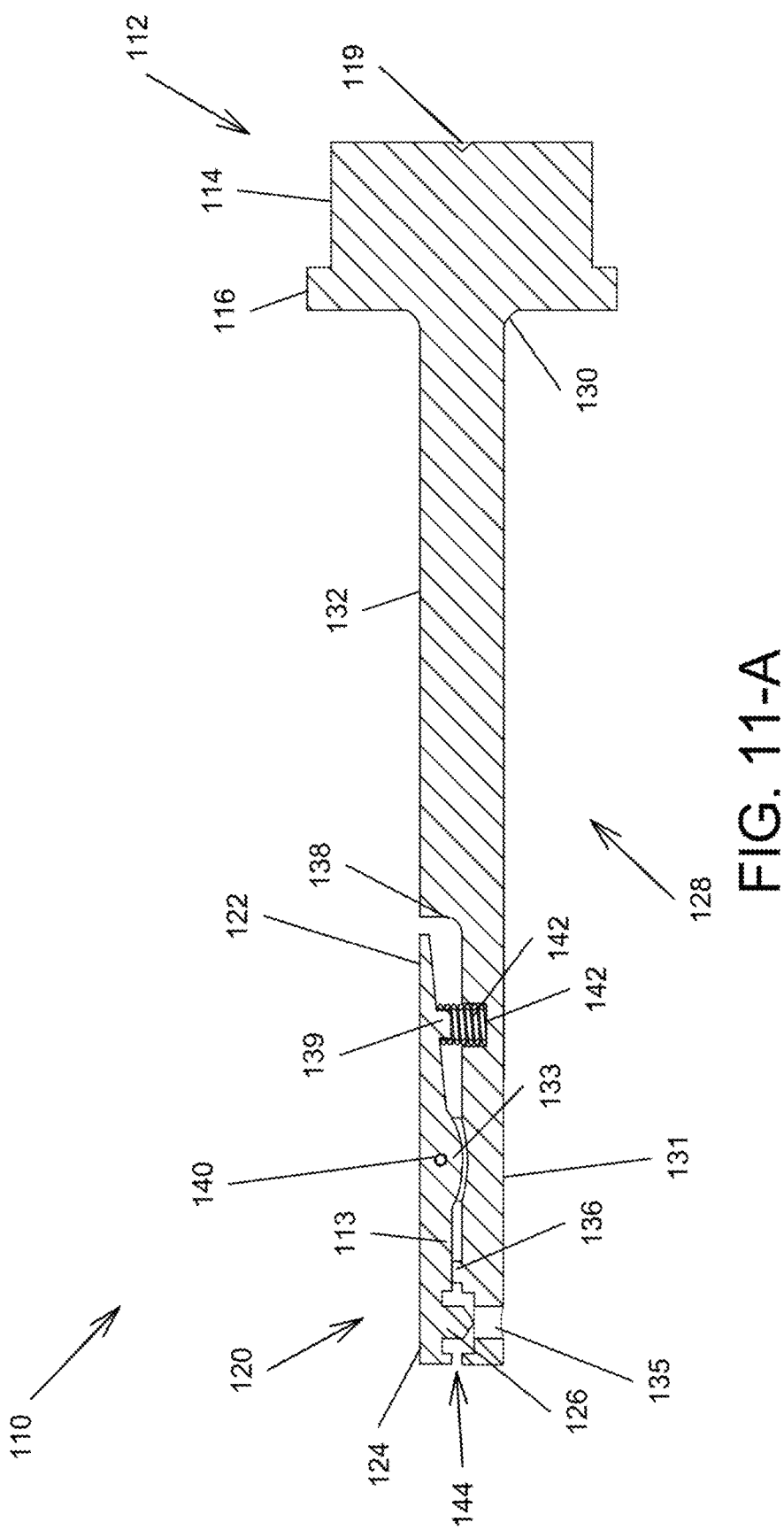
FIG. 11-A is a cross sectional elevation view of the coupon holder of FIG. 9.
Figure 12:
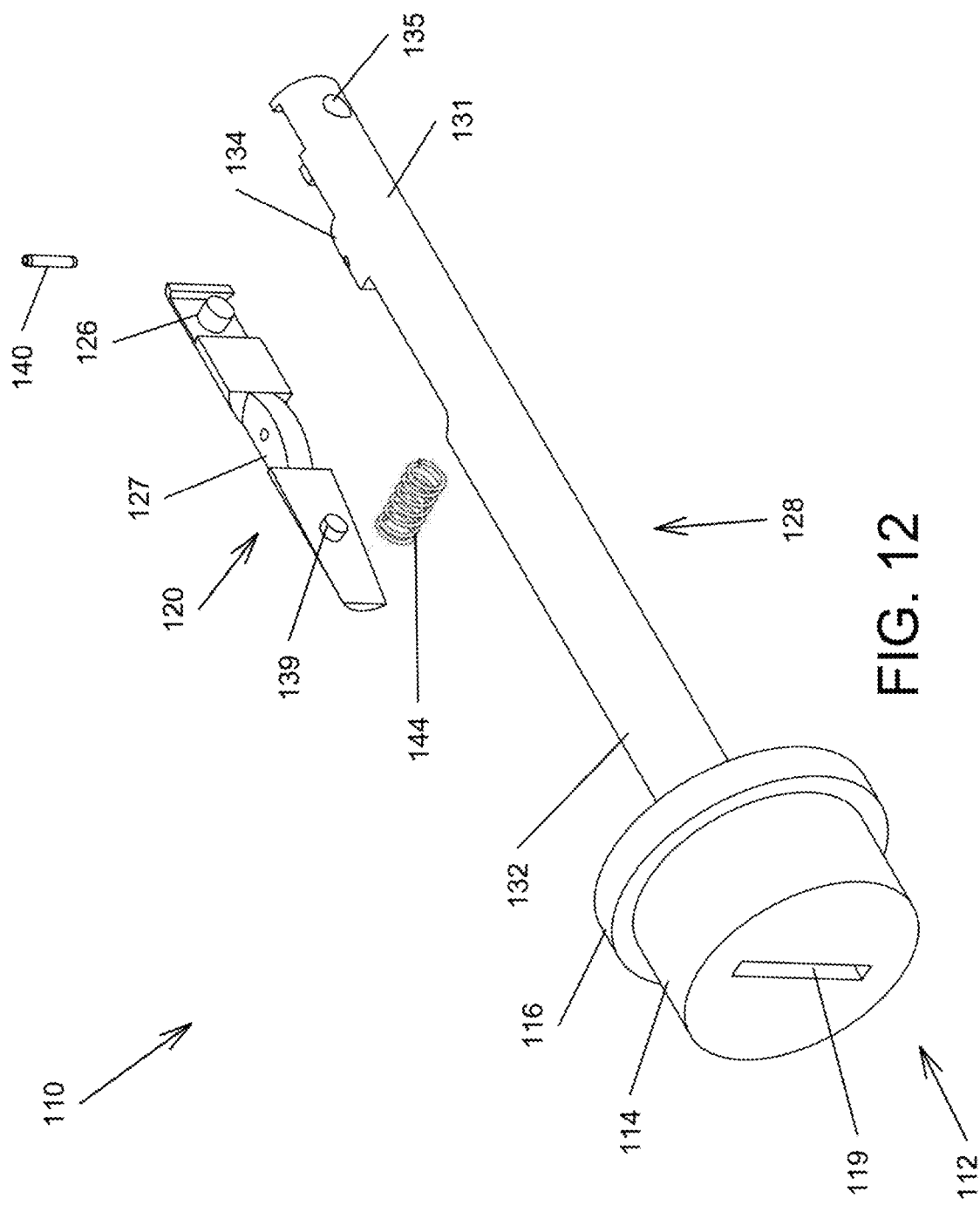
FIG. 12 is an exploded perspective view of the coupon holder of FIG. 9.
Figure 13:
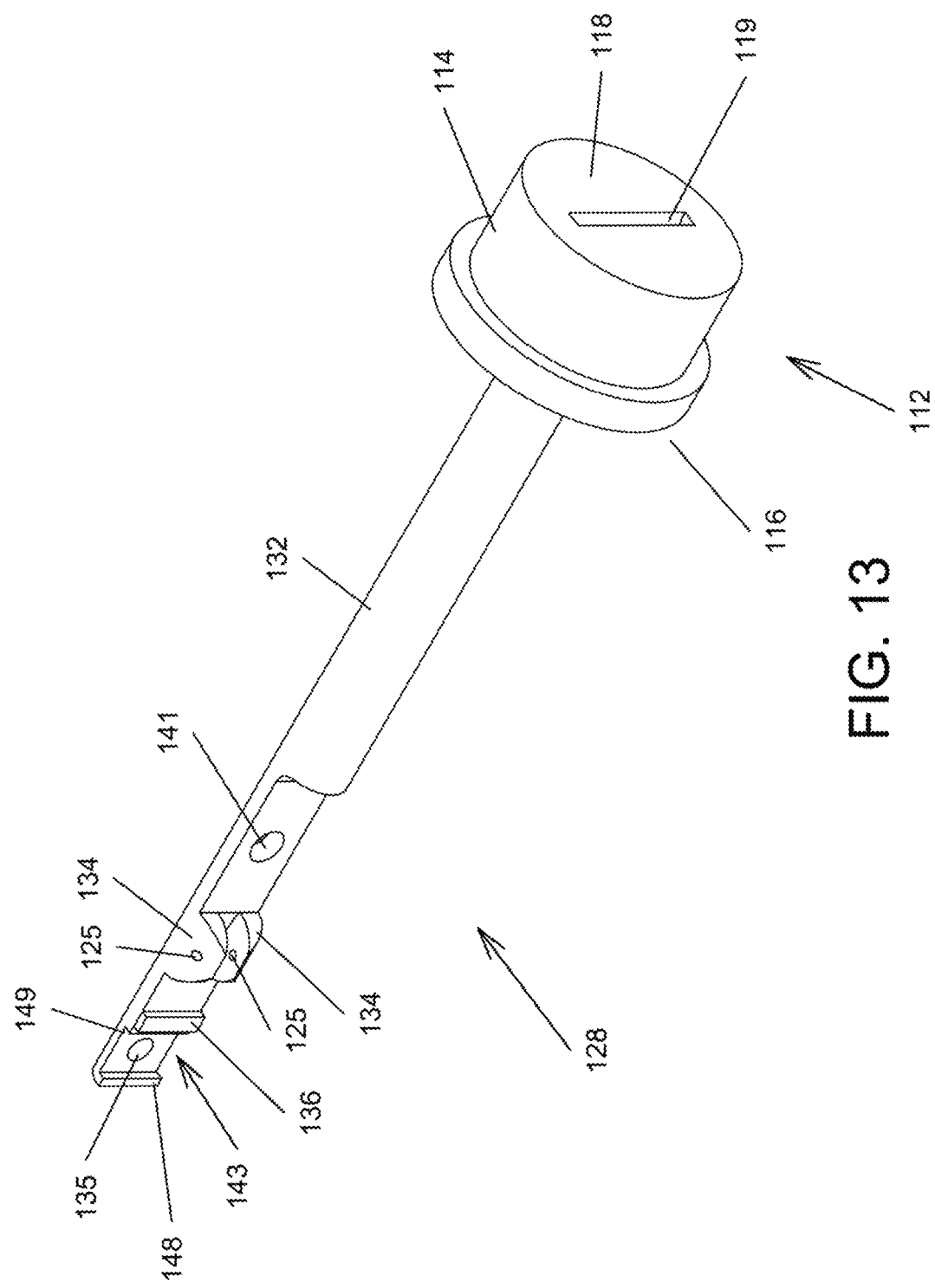
FIG. 13 is a perspective view of a shaft and rear cap portions of the coupon holder of FIG. 9.
Figure 18:
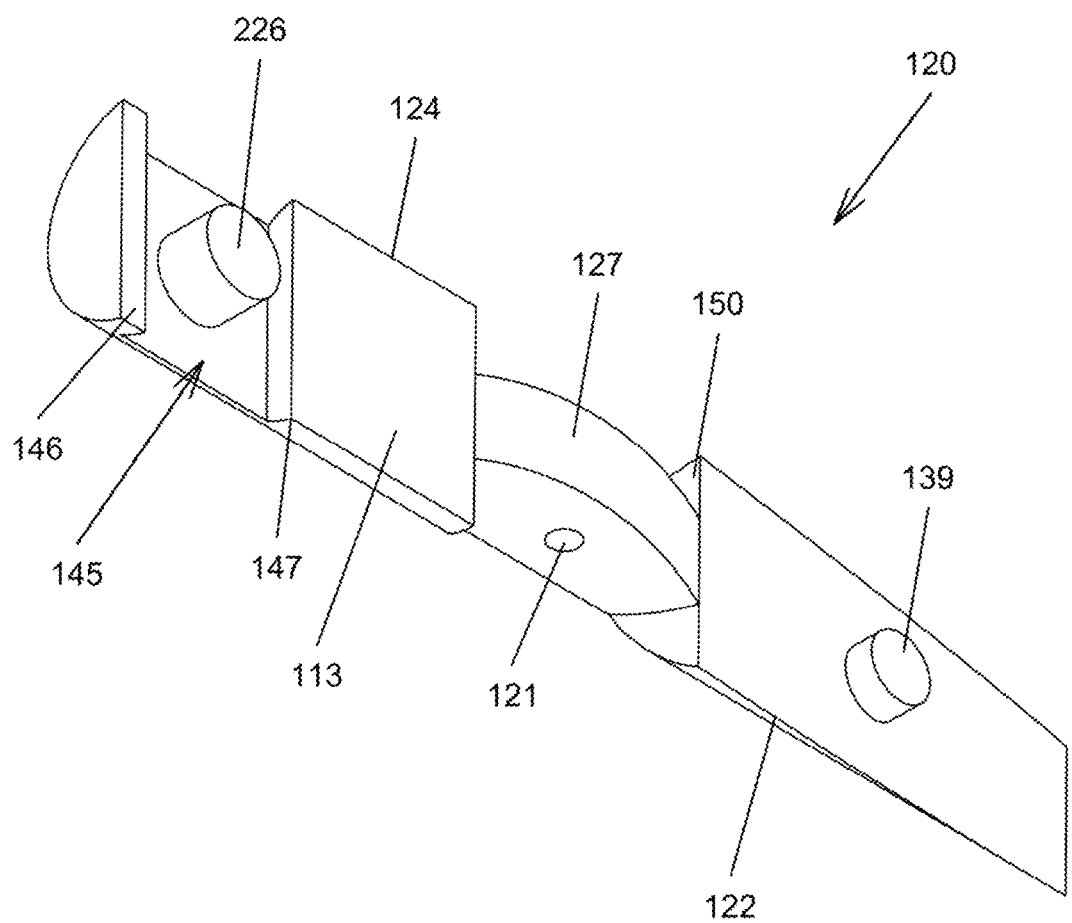
FIG. 18 is a perspective view of a clip portion of the coupon holder of FIG. 9.

Coupon specimen insertion area 44 is formed between an inner surface of a forward end of forward shaft portion 31 and an inner surface of a forward end of forward clip portion 24. The inner surfaces of clip portion 24 and shaft portion 31 in area 44 are both preferably substantially flat so that they each engage or abut a face of a coupon 90 when holder 10 (or clip 24) is in a closed position, with projection 26 inserted through aperture 92 in coupon 90 and a rear end of coupon 90 preferably abuts a forward face of spacer 36. Projection 26 is preferably sized to be long enough to be partially inserted into recess or aperture 35, if provided, on shaft portion 31 when holder 10 (or clip 24) is in a closed position. If no recess or aperture 35 is provided, then a distal end of projection 26 preferably abuts an inner surface of shaft forward portion 31 when holder 10 (or clip 24) is in a closed position. An inner surface of clip portion 24 (like surface 113 on holder 110 as shown in FIGS. 11-A and 17), rearward of projection 26, also preferably abuts an inner surface of spacer 36 when holder 10 (or clip 24) is in a closed position as shown in FIG. 5-A.

Figure 8B:
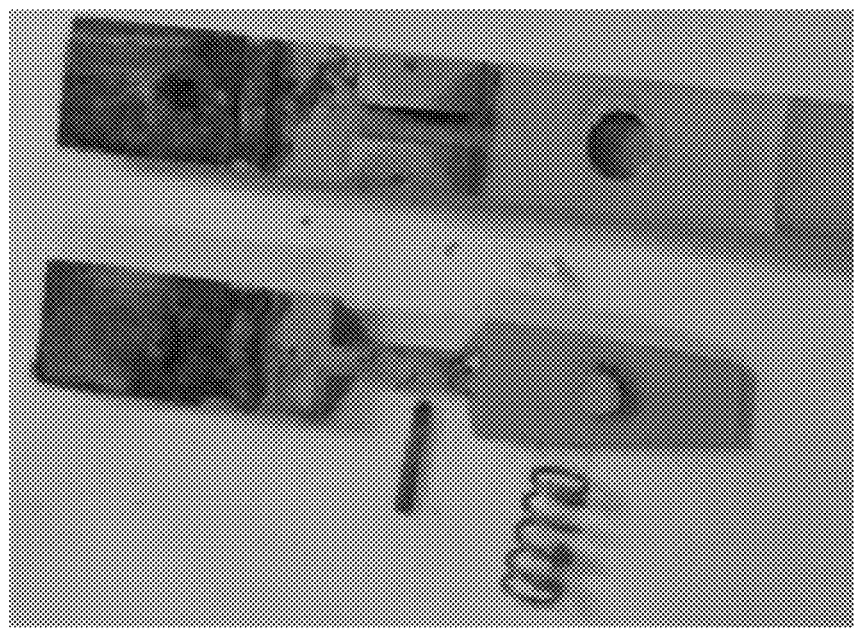
FIG. 8-A is an exploded view of forward portions of the coupon holder of FIG. 3.
Figure 8A:
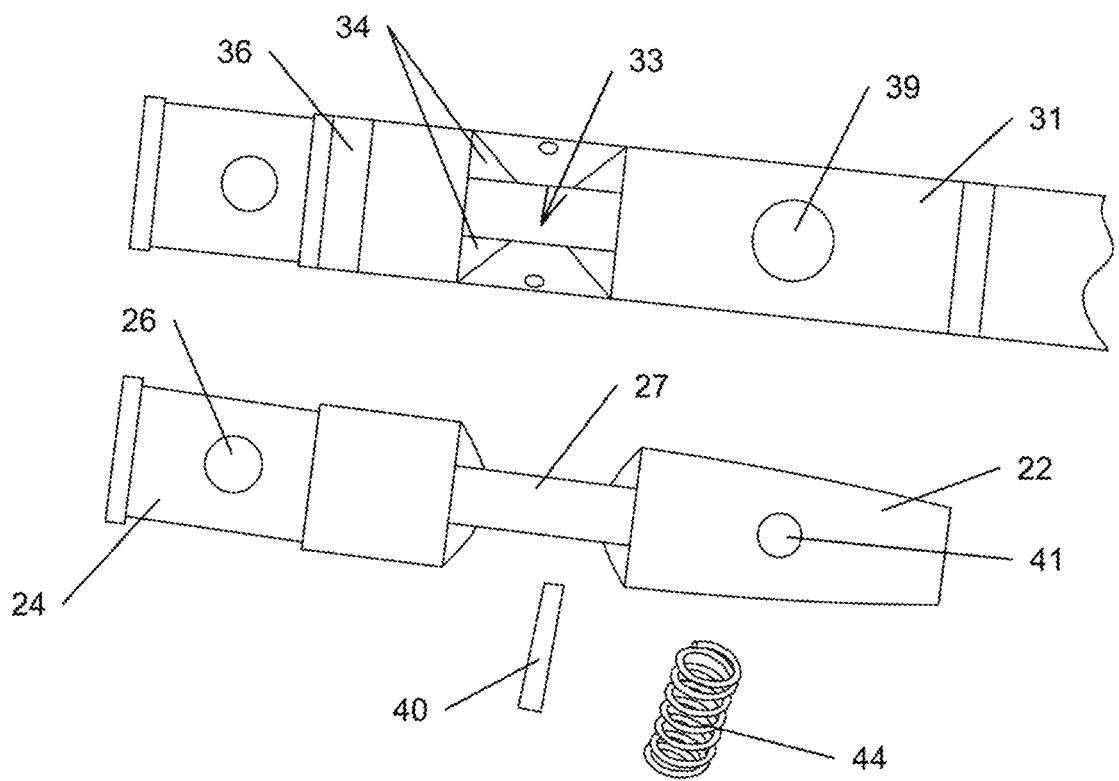

Coupon holder 10 has the benefit being easier and faster to use compared to prior art nut and bolt coupon holders; however, testing showed that coupon holder 10 resulted in a higher mild steel corrosion rate than a prior art nut and bolt holder in the same test water. Table 1 shows test results for a prior art coupon holder compared to coupon holder 10. The coupon used in the prior art holder showed a mild steel corrosion rate of 0.88 MPY, whereas the coupon used in coupon holder 10 showed a mild steel corrosion rate of 1.94 MPY. One of ordinary skill in the art would have expected the corrosion rate to be roughly the same, since the coupons were tested in the same water, but the rate was found to be unexpectedly higher with coupon holder 10. FIGS. 6-7 are photographs of the coupons from this test, with the coupon used in the prior art holder on the left and the coupon used with coupon holder 10 on the right, with the darker areas indicating corrosion. FIG. 8-B is a photograph of the inner surfaces of clip 20 and forward shaft portion 31 after this test. The significant corrosion on the inner surfaces of the forward ends of clip portion 24 and shaft portion 31 is shown by the darker colored area. It is believed that the higher corrosion rate for coupon holder 10 was due to more surface area contact between holder 10 and coupon 90 than the prior art coupon holders. The contact surfaces for a prior art nut and bolt holder are shown in hash marks on FIG. 21 and for coupon holder 10 are shown in hash marks on FIG. 22. The contact area for coupon holder 10 was found to be around 36% greater than the prior art contact area, which resulted in under deposit corrosion, a more severe form of localized corrosion. Coupon holder 10 effectively resulted in a falsely high corrosion rate due to the under deposit corrosion, which could result in unnecessary treatment of the water or other fluid system.

TABLE 1

|  | Mild Steel | | Copper | |
| --- | --- | --- | --- | --- |
|  | Holder 10 | Prior Art Holder | Holder 10 | Prior Art Holder |
| Coupon Ser. No. | 69171 | 69172 | 68534 | 68533 |
| Starting Weight (grams) | 11.1555 | 11.1230 | 13.1103 | 13.0836 |
| End Weight (grams) | 10.9249 | 11.0182 | 13.1020 | 13.0771 |
| Exposure Time (days) | 98 | 98 | 98 | 98 |
| Corrosion Rate (MPY) | 1.94 | 0.88 | 0.06 | 0.04 |

Although measurements using coupon holder 10 could be adjusted to account for the additional corrosion resulting from the contact between holder 10 and coupon 90, such as by scaling down corrosion measurements by an adjustment rate determined through experimentation comparing the results of coupons used with holder 10 and a prior art holder, to avoid unnecessary over treatment of the water or other fluid system, holder 10 can also be modified according to other preferred embodiments of the invention to reduce the contact area between the holder and the coupon.

A quick release coupon holder 110 according to another preferred embodiment of the invention is shown in FIGS. 1-2 and 9-18. Coupon holder 110 has reduced contact area with a coupon relative to coupon holder 10, as further discussed below. Coupon holder 110 preferable comprises a rear cap 112, a clip 120, a shaft 128, a pin 140, and a spring 142. Rear cap 112 preferably comprises a rear cylindrical body 114, a flange 116, a rear surface 118, and a coupon alignment indicator 119. Cylindrical body 114 is preferably sized to fit through an aperture 52 in nut 50, as shown in FIG. 1, so that at least a portion of cylindrical body 114 extends rearwardly of nut 50. Cylindrical body 114 is also preferably around 1.0 to 1.5 inches long, so that a greater portion of cylindrical body 114 extends rearwardly of nut 50 compared to cylindrical body 14 on holder 10. This provides greater surface area for a user to grip cylindrical body 114 when adjusting the positioning of holder 110 in a pipe of a coupon rack and/or for tightening connections to secure holder 110 in a coupon rack. Flange 116 is preferably sized to be inserted into nut body 56 and to abut a forward side of shoulder 54. A coupon alignment indicator 119 is preferably disposed on rear surface 118 as further described below.

Shaft 128 is preferably disposed forwardly of rear cap 112 and comprises a forward shaft portion 131, shoulder 138, and rear shaft portion 132. Shaft 128 is preferably sized to fit through apertures 62 and 72 to allow a portion of shaft 128 and coupon 90 when inserted into holder 110 to be inserted into a pipe extending from tee-coupler 70 in a coupon rack. A shoulder 130 preferably joins rear shaft portion 132 to flange 116. Shaft 128 preferably has a length (between flange 116 and a forward end of shaft 128) of around 5.75-6.50 inches, more preferably around 6.00-6.25 inches. Rear shaft portion 132 is preferably cylindrical, but may also be rectangular or have another shape. A shoulder 138 is formed between rear shaft portion 132 and forward shaft portion 131 to reduce the size of forward shaft portion 131 relative to rear portion 132, providing a recessed area to receive clip 120. Most preferably, a radius or height of forward shaft portion 131 is around 50% of the radius or height of rearward shaft portion 132. Forward shaft portion 131 preferably comprises a spacer 136 and a recess 141 configured to receive spring 142. Spacer 136 preferably comprises a raised lip protruding inwardly from shaft portion 131 toward forward clip portion 124. A forward end of forward shaft portion 131 preferably comprises a lip 148 and a shoulder 149 which form a recessed area 143 on an inner surface of shaft portion 131. Shoulder 149 is preferably disposed forwardly of spacer 136. Spacer 136 also preferably acts as a rear stop for a coupon 90 inserted into holder 110, such that a rearward edge of the coupon 90 would preferably abut a forward surface of spacer 136. Once inserted into holder 110, coupon 90 preferably only contacts shaft 128 on the inner surfaces of lip 148 and shoulder 149 and the front surface of spacer 136. An optional, but preferred, secondary recess or aperture 135 is also disposed within recessed area 143.

Forward shaft portion 131 also preferably comprises a clip holder. Clip holder preferably comprises two spaced apart bodies 134 with an opening 123 disposed between them that is configured to receive a pivot area or pivot body 127 on clip 120. Disposed through each clip holder body 134 is an aperture 125 configured to receive a pin 140 (that also passes through aperture 121, discussed below) to secure clip 120 to shaft 128 and allow pivotal movement of clip 120 relative to shaft 128. Clip holder 134 and pin 140 act as a fulcrum to support clip 120 and allow it to pivot between open and closed positions according to this preferred embodiment. Each clip holder body 134 is preferably a semi-circular or other rounded shape.

Clip body 120 preferably comprises a forward portion 124, a rearward portion 122, and a pivot area or pivot body 127. Disposed through pivot body 127 is an aperture 121 configured to align with apertures 125 to receive pin 140. As compared to pivot area 27 for holder 10 (as shown in FIG. 5-A), pivot body 127 preferably comprises an elongated arcuate area 133 (best seen in FIGS. 11-A and 16) around aperture 121. The radius of pivot area 127 is preferably around 0.60 to 0.70 inches. This makes the height of pivot body 127 at its highest point (which is substantially in-line vertically with aperture 121) greater than the height of pivot area 27 and also greater than the height of the adjacent end of clip portion 124. A forward end 150 of clip portion 122 and a rearward end 152 of clip portion 124, both adjacent pivot body 127, are preferably arcuate with a radius of around 0.30 to 0.35 inches.

Figure 9:
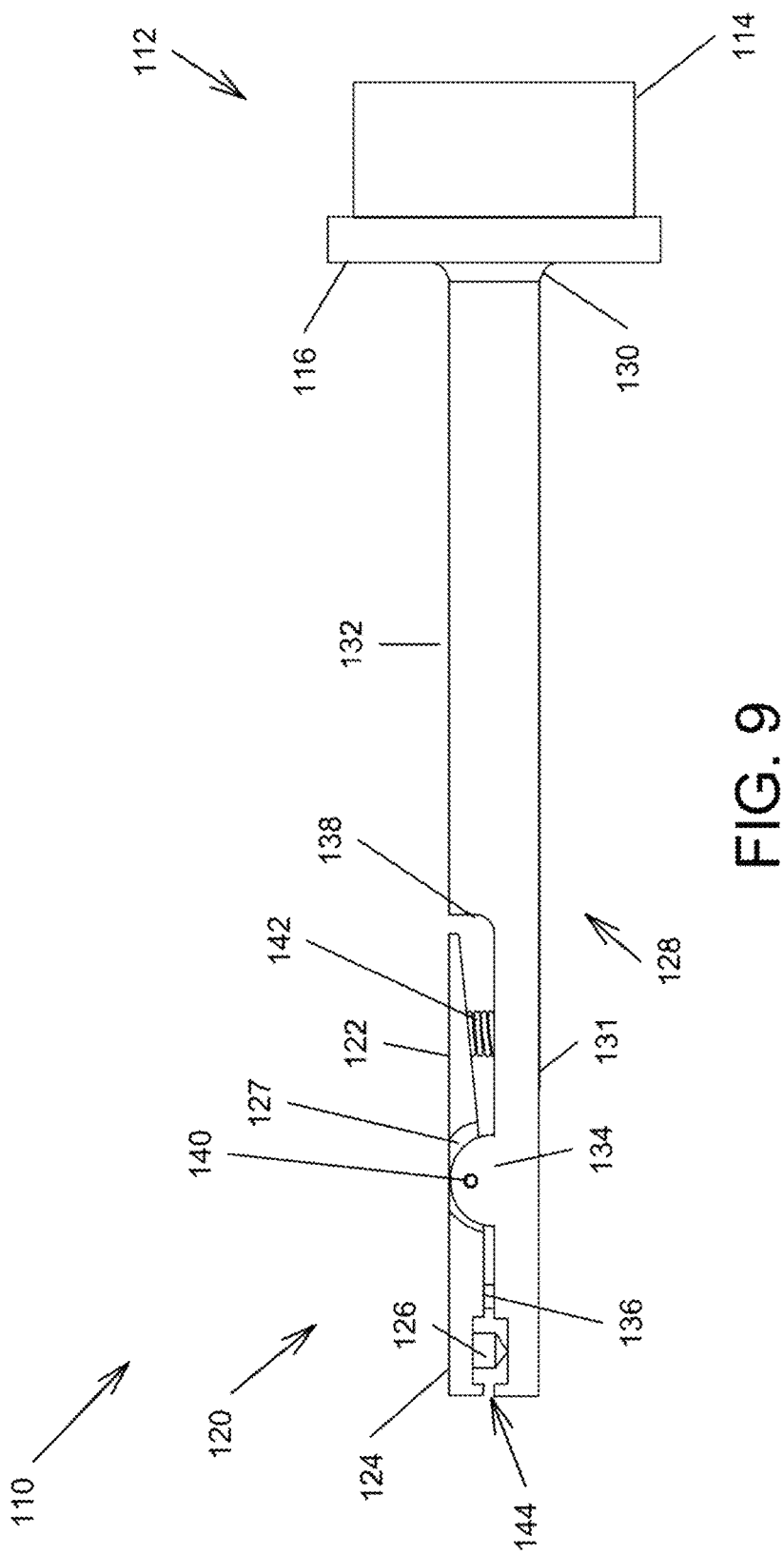
FIG. 9 is a side elevation view of a coupon holder according to another preferred embodiment of the invention.

Forward clip portion 124 preferably comprises a lip 146, a shoulder 147, and coupon engagement projection 126 disposed between lip 146 and shoulder 147. Between lip 146 and shoulder 147 and around projection 126 is a recessed area 145 on an inner surface of forward clip portion 124. Once inserted into holder 110, coupon 90 preferably only contacts clip 120 on the inner surfaces of lip 146 and shoulder 147 and around a portion of projection 126. Projection 126 extends inwardly from clip portion 124 toward forward shaft portion 131. A distal end of projection 126 preferably engages with and is partially inserted into recess or aperture 135, if recess or aperture 135 is included, when coupon holder 110 (or clip 124) is in a closed position. Most preferably a distal end of projection 126 has a pointed or tapered shape (as shown in FIG. 16) to aid in aligning projection 126 with aperture 92 on coupon 90, but a rounded shape or other shape may also be used, such as a flat shape as shown for alternate projection 226 in FIG. 18. If no recess or aperture 135 is provided, then a distal end of projection 126 preferably abuts an inner surface of recessed area 143 and the distal end is most preferably substantially flat. An inner surface 113 (as shown in FIG. 17) of forward clip portion 124 is disposed rearwardly of shoulder 147. Surface 113 is preferably substantially flat to abut an inner surface of spacer 136 on shaft portion 131 when holder 110 (or clip 124) is in a closed position as shown in FIGS. 9 and 11-A.

Rearward clip portion 122 is preferably tapered in thickness relative to forward clip portion 124. Forward clip portion 124 is preferably around 0.18 to 0.20 inches high and rearward clip portion 122 is preferably around 0.18 to 0.20 inches high at its maximum height (near pivot body 27) and around 0.060 to 0.065 inches high at its minimum height (at its rear-most end). Like rear clip portion 22, an inner surface rear clip portion 122 is preferably disposed at an angle α of around 84° to 85°, most preferably around 84.5° relative to a vertical axis that is perpendicular to inner surface 113 of forward clip portion 124 (similar to axis 11 that shown in FIG. 5-B). Rearward portion 122 preferably comprises a spring retaining projection 139 that extends inwardly toward forward shaft portion 131. Retaining projection 139 is preferably cylindrical and sized to receive an end of spring 142 around an exterior surface of retaining projection 139 to aid in holding spring 142 in position between clip body 120 and shaft 128. Preferably, spring 142 has an outside diameter range of 0.20 to 0.25 and a length of 0.45 to 0.55. Most preferably spring 142 has an outside diameter of around 0.25 inches and a length of around 0.5 inches, but other sizes may also be used. Spring 142 is preferably made of stainless steel, but other suitable materials that are resistant to corrosion may also be used. Spring 142 is preferably rated to around 19.0 to 20.0 lb/in. Most preferably, spring 142 has a rating of at least 19.5.

Lips 146, 148 form a spaced-apart pair of lips. Shoulders 147, 149 form a spaced-apart pair of shoulders. The gap area between lips 146, 148 and shoulders 147, 149 and forward of spacer 136 forms coupon specimen insertion area 144. When in a closed position, the combined height of forward portion of clip body 124, a gap formed by insertion area 144, and forward portion of shaft body 131 (as shown in the orientation of FIG. 9) is around 0.40-0.60 inches, more preferably around 0.50 inches. Lips 146, 148 and shoulders 147, 149 are configured to engage with front and rear surfaces of a corrosion coupon 90, with projection 126 inserted through aperture 92 in coupon 90 and a rear end of coupon 90 preferably abutting a forward face of spacer 136, to secure coupon 90 in holder 110 when holder 110 (or clip 124) is in a closed position. As an alternative to shoulders 147, 149, a second pair of lips or similar projection providing a limited contact surface area for supporting the coupon may be used. Projection 126 is preferably sized to be long enough to be partially inserted into recess or aperture 135, if provided, on shaft portion 131 when holder 110 (or clip 124) is in a closed position. If no recess or aperture 135 is provided, then a distal end of projection 126 preferably abuts an inner surface of recessed area 143 when holder 110 (or clip 124) is in a closed position. An inner surface 113 of clip portion, rearward of projection 126 and shoulder 147, also preferably abuts an inner surface of spacer 136 when holder 110 (or clip 124) is in a closed position as shown in FIG. 11-A.

Figure 21:
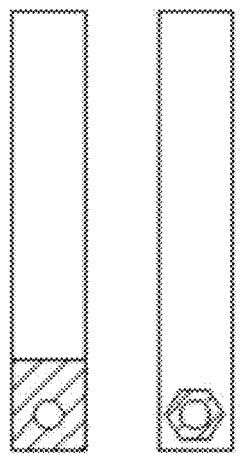
FIG. 21 are top and bottom plan views of a coupon showing the contact areas in hash marks for a prior art nut and bolt coupon holder.
Figure 22:
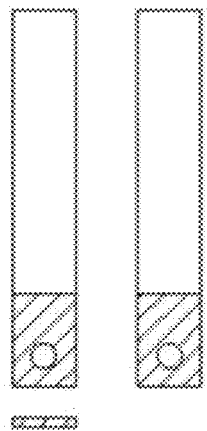
FIG. 22 are top and bottom plan views of a coupon showing the contact areas in hash marks for the coupon holder of FIG. 3.
Figure 23:
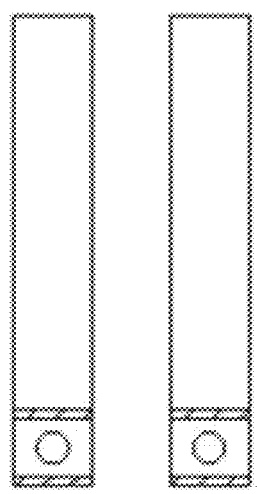
FIG. 23 are top and bottom plan views of a coupon showing the contact areas in hash marks for the coupon holder of FIG. 9.

Coupon holder 110 has the benefit being easier and faster to use compared to prior art nut and bolt coupon holders and has reduced contact area between the holder 110 and coupon compared to holder 10 and compared to the prior art nut and bolt holder. The contact surfaces for a prior art nut and bolt holder are shown in hash marks on FIG. 21, for holder 10 are shown in hash marks on FIG. 22, and for holder 110 are shown in hash marks on FIG. 23. The contact area for a prior art holder as shown in FIG. 21 (including the back and front contact surfaces and inside the mounting hole) was calculated at around 0.604519 in$^2$. The contact area for coupon holder 10 in FIG. 22 (including the back and front contact surfaces with inner surfaces of 24, 31, contact around engagement projection 26, and contact with a forward face of spacer 36) was calculated at around 0.82052 in$^2$. The contact area for coupon holder 110 in FIG. 23 (including the back and front contact surfaces with shoulders 147, 149 and lips 146, 148, contact around engagement projection 126 and contact with a forward face of spacer 136) The contact area for coupon holder 110 was found to be around 57% less than the prior art contact area in FIG. 21. Most preferably, the surface area for contact of each lip 146, 148 and shoulder 147, 149 to a coupon is around 0.1 to 0.5 in$^2$, more preferably around 0.1 to 0.15 in$^2$. Most preferably, the total contact area between a coupon and holder 110 (contact with lips 146, 148, shoulders 147, 149, spacer 136, and projection 126) is around 0.1 to 0.6 in$^2$, more preferably around 0.1 to 0.25 in$^2$.

Figure 19:
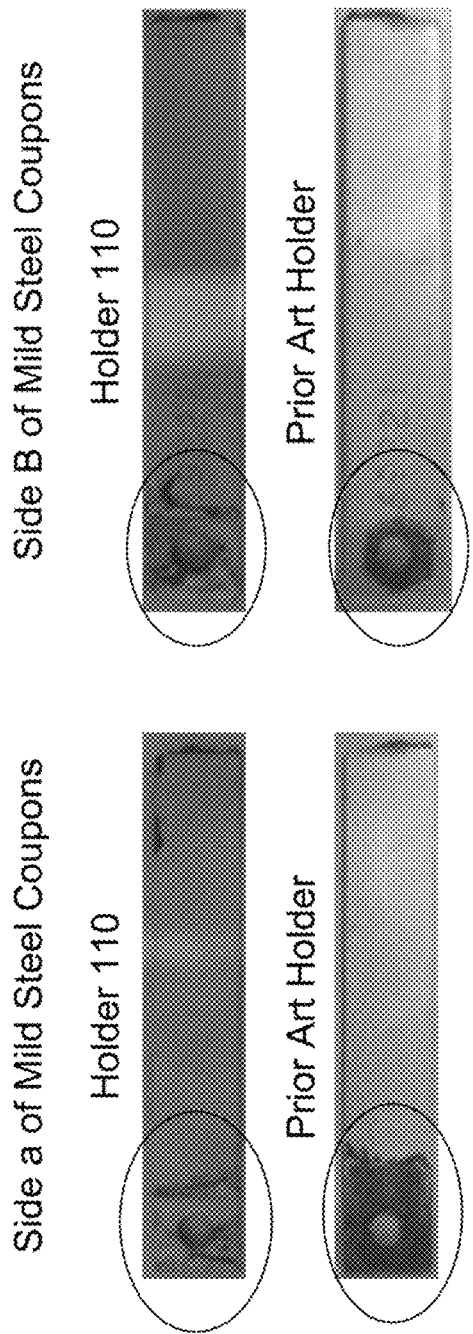
FIG. 19 contains photographs showing the corrosion on Sides A and B of the coupons referenced in Table 2.
Figure 20:
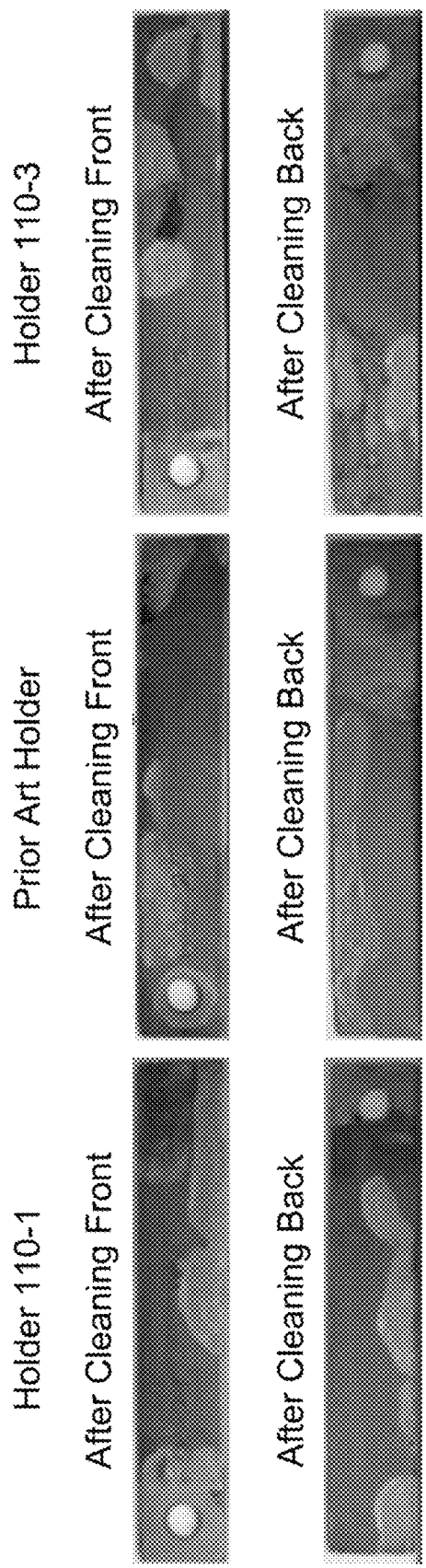
FIG. 20 contains photographs showing the corrosion on Front and Back Sides of the coupons referenced in Table 3 after cleaning.

Table 2 shows test results for a prior art coupon holder compared to coupon holder 110 using a spring 142 having a rating of around 14.95 lbs/in. The coupon used in the prior art holder showed a mild steel corrosion rate of 0.24 MPY, whereas the coupon used in coupon holder 110 showed a mild steel corrosion rate of 0.69 MPY. Again, one of ordinary skill in the art would have expected the corrosion rate to be roughly the same, since the coupons were tested in the same water, or that the rate using holder 110 would be less than the prior art due to the reduced contact area, but the rate was found to be unexpectedly higher with coupon holder 110 using a spring 142 having a rating of around 14.95 lbs/in. Photographs of the coupons from this test are shown in FIG. 19, with the coupon used in the prior art holder on the bottom and the coupon used with coupon holder 110 on the top, with the darker areas indicating corrosion. It is believed that the higher corrosion rate for coupon holder 110 in this test was still due to under deposit corrosion because the force applied by spring 142 was not sufficient. A stronger spring 142, rated to 19.58 lbs/in was used with holder 110 in a second test, the results of which are shown in Table 3. This test used two holders 110-1 (for the coupon labeled "SN: 69227") and 110-3 (for the coupon labeled "SN: 69226), in the first and third positions in the coupon rack 80 respectively, with the prior art nut and bolt holder (for the coupon labeled "SN: 69225") in the second position. The corrosion rates for holders 110-1 and 110-3 were 5.21 MPY and 5.18 MPY and the rate for the prior art holder was 5.10 MPY, which are substantially similar for purposes of the test. FIG. 20 shows photographs of the coupons used in this test with the spotted, lighter areas showing where corrosion was prior to cleaning. Using a stronger spring 142 in holder 110 resulted in a corrosion rate for holder 110 that is substantially consistent with the rate achieved using a prior art nut and bolt holder. As such, it is preferred to use a spring having a rating of at least around 19.0 lbs/in, more preferably at least 19.5 lb/sin, and most preferably a rating of at least 19.58 lbs/in in holder 110, but it is not required and springs having other ratings (both stronger and weaker), as well as other types of springs, wedges, or levers, may also be used.

TABLE 2

|  | Mild Steel | | Copper | |
| --- | --- | --- | --- | --- |
|  | Holder 110 | Prior Art Holder | Holder 110 | Prior Art Holder |
| Coupon Ser. No. | 69222 | 69221 | 68501 | 68520 |
| Starting Weight (grams) | 11.1499 | 11.1703 | 13.1586 | 13.1444 |
| End Weight (grams) | 10.0696 | 11.1413 | 13.1549 | 13.1408 |
| Exposure Time (days) | 96 | 96 | 96 | 96 |
| Corrosion Rate (MPY) | 0.69 | 0.24 | 0.02 | 0.02 |

TABLE 3

|  | Mild Steel | | |
| --- | --- | --- | --- |
|  | Holder 110-1 (1st in Line) | Prior Art Holder (2nd in Line) | Holder 110-3 (3rd in Line) |
| Coupon Ser. No. | 69227 | 69225 | 69226 |
| Starting Weight (grams) | 11.1744 | 11.1612 | 11.2007 |
| End Weight (grams) | 10.6147 | 10.6129 | 10.6441 |
| Exposure Time (days) | 89 | 89 | 89 |
| Corrosion Rate (MPY) | 5.21 | 5.10 | 5.18 |

Two additional field tests using a prior art coupon holder compared to coupon holder 110 using a spring 142 having a rating of around 19.58 lbs/in were conducted. The first field test was conducted on a chilled loop system in Delaware. The first test used two mild steel C1010 coupons that were exposed to the water for 117 days. The first coupon in the first test, held in the chilled loop system using a prior art coupon holder, had an initial weight of 11.3669 grams and a final weight of 11.3566 grams, with a corrosion rate of 0.07 MPY. The second coupon in the first test, held in the chilled loop system using a coupon holder 110, had an initial weight of 11.3881 grams and a final weight of 11.3796 grams, with a corrosion rate of 0.05 MPY. Being the same type of metal coupon in the same water for the same duration, the coupons would be expected to have the same corrosion rate; however, the corrosion rate for the coupon held using coupon holder 110 was unexpectedly lower.

The second field test was conducted in a cooling tower in Texas using the same type of mild steel C1010 coupons as the first test. The exposure time in the second test was 98 days. The first coupon in the second test held in the cooling tower system using a prior art coupon holder, had an initial weight of 11.3335 grams and a final weight of 11.2662 grams, with a corrosion rate of 0.56 MPY. The second coupon in the second test, held in the cooling tower system using a coupon holder 110, had an initial weight of 11.3522 grams and a final weight of 11.3014 grams, with a corrosion rate of 0.42 MPY. Again, being the same type of metal coupon in the same water for the same duration, the coupons would be expected to have the same corrosion rate; however, the corrosion rate for the coupon held using coupon holder 110 was unexpectedly lower.

The results of these field tests further indicate that a coupon holder according to preferred embodiments of the invention provides a more accurate corrosion measurement compared to a prior art holder. The measurement with the prior art holder is artificially high based on additional corrosion caused in the area of contact between the coupon and the prior art holder. By having reduced contact with the coupon, coupon holders according to preferred embodiments provide more accurate results, which allows for a more effective and less costly treatment program that avoids adding unnecessary amounts of corrosion inhibitors treatment products. Coupon holders according to preferred embodiments are also easier to use in inserting and removing coupons than prior art holders. Coupon holders according to preferred embodiments of the invention may be used in monitoring any water or other fluid system for corrosion, but are particularly well suited for use with corrosion racks used in water systems such as open recirculating systems, closed loop cooling or heating systems, cooling towers and boilers.

A preferred method of installing and/or removing a coupon from a coupon holder 10/110 comprises the following steps: (1) providing a coupon holder 10/110 comprising a shaft and a clip configured to pivot between an open position and a closed position relative to the shaft and configured to securely hold a first end of a corrosion coupon 90 when the holder 110/110 (or clip 24/124) is in the closed position with a distal end of the coupon 90 extending forwardly from the holder 10/110; (2) (a) applying a force on a rear end of the clip 22/122 to cause a forward end of the clip 24/124 to move away from the shaft 31/131, placing the holder 10/110 (or clip 24/124) in the open position or (b) moving a wedge or lever from a first position in which the clip 24/124 is held in a closed position to a second position to cause a forward end of the clip to move away from the shaft, placing the holder 10/110 (or clip 24/124) in the open position; (3) removing any existing coupon 90 disposed in a coupon insertion area 44/144 between the clip 20/120 and the shaft 28/128; (4) optionally inserting a new coupon 90 in a coupon insertion area 44/144 between the clip 20/120 and the shaft 28/128; and (5)(a) releasing the force on the rear end of the clip 22/122 to cause the forward end of the clip 24/124 to move toward to the shaft 31/131, placing the holder 10/110 (or clip 24/124) in the closed position or (b) moving the wedge or lever back to the first position, placing the holder 10/110 (or clip 24/124) in the closed position.

According to another preferred embodiment, step (4) further comprises (a) aligning an aperture 92 in the first end of the coupon 90 with an inwardly extending coupon engagement projection 26/126 disposed on the shaft 31/131 or the clip 24/124; and/or (b) abutting a rear face of the first end of the coupon 90 to an inwardly extending spacer 36/136 disposed on the shaft 31/131 or the clip 24/124.

According to another preferred embodiment of installing and/or removing a coupon from a coupon holder 10/110 for use in a coupon rack 80, the method further comprises the following steps: (5) shutting off flow of water or other fluid to the coupon rack 80 and optionally draining any water in the piping of the coupon rack; (6) loosening any connections between a nut 50, socket 60, and/or tee-coupler 70 as needed to remove the coupon holder 10/110 of step 1 from the coupon rack; (7) carrying out steps 2-5 above to remove an old coupon 90 and optionally install a new coupon 90 in the holder 10/110; (8) reinserting the optional new coupon 90 and at least a portion of the shaft 28/128 of the holder 10/110 into the coupon rack pipe; (9)(a) optionally viewing the position of an alignment indicator 19/119 on a rear end 12/112 of the holder 10/110 that extends outwardly of the coupon rack pipe and the nut 50 used to secure to the holder 10/110 to the coupon rack 80 to ensure that the coupon's width is aligned vertically in the pipe and (b) optionally rotating the holder 10/110 until the alignment indicator 19/119 indicates the coupon 90 is aligned vertically in the pipe; (10) re-tightening all connections 50, 60, 70 that were loosened in step 6; and (11) turning on flow of water or other fluid to the coupon rack 80. Certain connections may be re-tightened in step 10 before carrying out optional step 9, but it is most preferred that the nut 50 securing the holder 10/110 to the coupon rack not be re-tightened until optional step 9 is completed. These steps are periodically repeated at the end of a test cycle so that corroded coupons may be removed for testing to determine corrosion rate of the water or fluid system, with new coupons optionally being installed to start a new test cycle.

Most preferably, the coupon holder used in the preferred methods of the invention is a holder one according to one of the preferred embodiments of the invention.

Although it is preferred to use a spring 42/142 to provide the force to hold holder 10/110 (or clip 24/124) in a closed position, other components, such as a wedge that may be inserted/removed under rear portion 22/122 or flipped or rotated or slid between positions that allow rear portion 22/122 to be pressed toward shaft portion 31/131 or prevent rear portion 22/122 from being pressed toward shaft portion 31/131, to allow clip 20/120 to pivot or move between an open and closed position may also be used. Any component described herein as being located on the clip 20/120 (such as projection 26/126, spring retaining projection 39/139, or pivot area/body 27/127) may likewise be located on a corresponding position on shaft 28/128, particularly on forward shaft portion 31/131, with corresponding changes in the location of other components that engage therewith and are described as being located on shaft 28/128/31/131 (such as recess 35/135, recess 41/141, and clip holder bodies 34/134). Similarly, components such as spacer 36/136 may be located on clip 20/120 instead of forward shaft portion 31/131 and vice-versa.

Figure 5A:
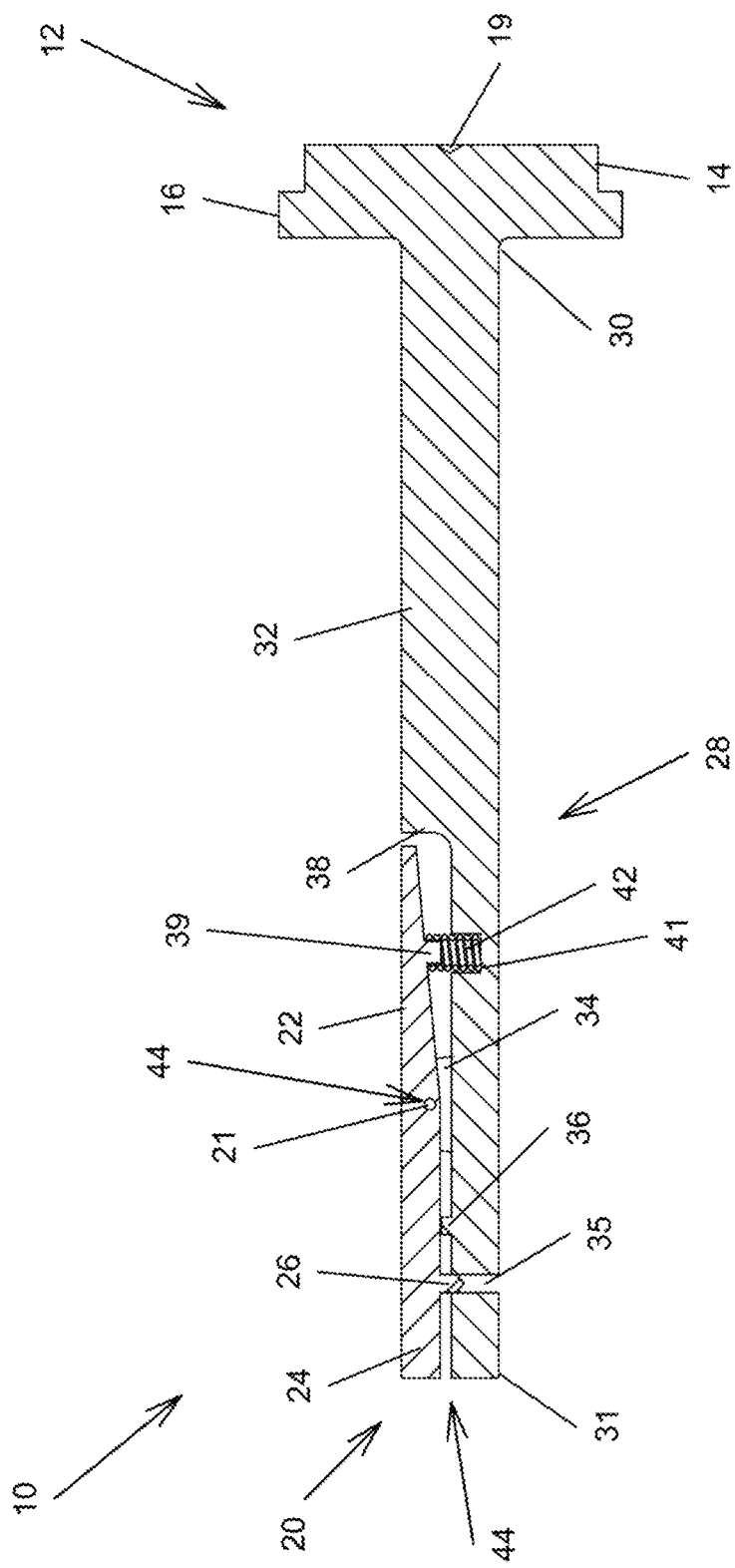

References herein to height and the like refer to the dimension measured in a direction substantially parallel with axis 11 as shown in FIG. 5A. References herein to forward, front and similar terms refer to a direction generally from cap 12/112 toward clip 20/120 and as indicated with an arrow line on specific figures. References herein to rearward, rear, and similar terms mean in a direction generally from clip 20/120 toward cap 12/112. Unless specifically excluded, any preferred features and optional components of any coupon holder embodiment, such as embodiments 10 and 110, and/or method steps described herein may be used with any other embodiment, even if not specifically described herein with that particular embodiment. All dimensions, sizes, numerical rating, ratio, or percentages indicated herein as a range include each individual amount, numerical value, or ratio within those ranges and any and all subset combinations within ranges, including subsets that overlap from one preferred range to a more preferred range. Those of ordinary skill in the art will also appreciate upon reading this specification, including the examples contained herein, that modifications and alterations to the preferred embodiments of coupon holder and method may be made within the scope of the invention and it is intended that the scope of the invention disclosed herein be limited only by the broadest interpretation of the appended claims to which the inventor is legally entitled.

What is claimed:

1. A holder for a corrosion coupon, the holder comprising:
   a shaft; and
   a clip configured to pivot between an open position and a closed position relative to the shaft;
   wherein the holder is configured to securely hold a first end of the corrosion coupon when the clip is in the closed position.

2. The holder of claim 1 further comprising:
   a pin inserted through a portion of the shaft and a portion of the clip to secure the clip to the shaft; and
   a spring disposed between the shaft and the clip, wherein the spring is in an extended position when the clip is in the closed position and the spring is in a compressed position when the clip is in the open position.

3. The holder of claim 2 further comprising a spacer disposed on an inner surface of a forward portion of the shaft or an inner surface of a forward portion of the clip to form a coupon insertion area between the clip and the shaft.

4. The holder of claim 3 further comprising a coupon engagement projection disposed on one of the inner surface of the forward portion of the shaft or the inner surface of the forward portion of the clip; and
   wherein the coupon engagement projection is disposed forwardly of the spacer.

5. The holder of claim 4 wherein one of the spacer and the coupon engagement projection is disposed on the shaft and the other is disposed on the clip.

6. The holder of claim 4 further comprising:
   a retaining projection configured to engage with a first end of the spring;
   a first recess configured to receive a second end of the spring;
   wherein the retaining projection is disposed on one of the inner surface of the forward portion of the shaft or the inner surface of the forward portion of the clip and the recess is disposed on the other of the inner surface of the forward portion of the shaft or the inner surface of the forward portion of the clip; and
   wherein the spring is disposed rearwardly of the spacer.

7. The holder of claim 6 further comprising:
   a pair of opposed spaced apart lips, one on the forward portion of the shaft and the other on the forward portion of the clip;
   a pair of opposed spaced apart shoulders, one on the on the forward portion of the shaft and the other on the forward portion of the clip;

an aperture or a second recess disposed substantially opposite the coupon engagement projection and configured to receive an end portion of the coupon engagement projection when the holder is in the closed position;

wherein the lips are disposed forwardly of the coupon engagement projection and the shoulders are disposed forwardly of the spacer; and wherein the lips and shoulders are configured to engage with front and rear surfaces of the first end of the corrosion coupon and the coupon engagement projection is configured to engage with an aperture in the first end the corrosion coupon to secure the corrosion coupon in the holder.

8. The holder of claim 4 further comprising:

a pair of opposed spaced apart lips, one on the forward portion of the shaft and the other on the forward portion of the clip;

a pair of opposed spaced apart shoulders, one on the on the forward portion of the shaft and the other on the forward portion of the clip;

wherein the lips are disposed forwardly of the coupon engagement projection and the shoulders are disposed forwardly of the spacer; and wherein the lips and shoulders are configured to engage with front and rear surfaces of the first end of the corrosion coupon and the coupon engagement projection is configured to engage with an aperture in the first end of the corrosion coupon to secure the corrosion coupon in the holder.

9. The holder of claim 8 wherein when the corrosion coupon is placed in the coupon insertion area and the holder is in a closed position, the corrosion coupon only contacts the holder on inner facing surfaces of the lips and shoulders, a forward facing surface of the spacer; and a portion of the coupon engagement projection inserted through the aperture in the first end of the corrosion coupon.

10. The holder of claim 4 further comprising a recess or an aperture configured to receive an end portion of the coupon engagement projection when the holder is in the closed position;

wherein the recess or aperture is disposed on the inner surface of the forward portion of the shaft or the inner surface of the forward portion of the clip substantially opposite of the coupon engagement projection.

11. The holder of claim 3 further comprising:

a pair of opposed spaced apart lips, one on the forward portion of the shaft and the other on the forward portion of the clip;

a pair of opposed spaced apart shoulders, one on the on the forward portion of the shaft and the other on the forward portion of the clip;

wherein the lips are disposed forwardly of the shoulders and the shoulders are disposed forwardly of the spacer; and wherein the lips and shoulders are configured to engage with front and rear surfaces of the first end of the corrosion coupon to secure the corrosion coupon in the holder.

12. The holder of claim 11 wherein a distance between the spaced apart lips and between the spaced apart shoulders when the holder is in the closed position is substantially equal to the thickness of the corrosion coupon.

13. The holder of claim 11 wherein the spacer prevents the spaced apart lips and spaced apart shoulders from contacting each other when the holder is in the closed position.

14. The holder of claim 3 wherein the coupon insertion area has a height substantially equal to the thickness of the corrosion coupon to be inserted in the holder when the holder is in the closed position.

15. The holder of claim 1 wherein a forward portion of the shaft comprises a recessed area configured to receive the clip.

16. The holder of claim 15 wherein a rearward portion of the shaft has a height that is substantially the same as the combined height of the recessed area of the forward portion of the shaft and the clip when in the closed position and an optional gap between the forward portions of the shaft and the clip when in a closed position.

17. The holder of claim 1 further comprising a clip holder disposed on the shaft;

wherein the clip comprises a forward portion, a rearward portion, and a pivot body disposed between the forward and rearward portions, wherein the pivot body comprises a first aperture;

wherein the clip holder comprises a first body and a second body spaced apart laterally from each other and forming an opening configured to receive the pivot body, wherein the first body comprises a second aperture and the second body comprises a third aperture;

wherein the first, second and third apertures are configured to align together and to receive the pin to connect the clip to the shaft.

18. The holder of claim 17 wherein an inner surface of the rearward portion of the clip is disposed at an angle of around 84° to 85° degrees relative to an axis substantially perpendicular to inner surface of the forward portion of the clip.

19. The holder of claim 18 wherein the pivot body extends arcuately inward relative to the forward portion of the clip.

20. The holder of claim 17 wherein at least a portion of the pivot body has a height that is greater than a maximum height of the forward portion of the clip and greater than a maximum height of the rearward portion of the clip.

21. The holder of claim 1 further comprising a cap disposed at a rear end of the shaft, the cap comprising a cylindrical body, a flange, and a rear face;

wherein the cylindrical body is configured to extend through an aperture in a nut and the flange is configured to engage with an inner shoulder of the nut that is used to secure the holder in a coupon rack so that the clip and at least a portion of the shaft are inserted into a pipe in the coupon rack and at least a portion of the cylindrical body is accessible from an exterior of the pipe.

22. The holder of claim 21 further comprising an alignment indicator on the rear face of the cap, wherein the alignment indicator indicates the position of the corrosion coupon attached to the holder within the pipe of the coupon rack.

23. The holder of claim 1 further comprising:

a torsion spring comprising a first leg extending from a first end of the spring and a second leg extending from a second end of the spring;

wherein the torsion spring is disposed laterally between the shaft and the clip;

wherein at least a portion of the first leg engages with the clip and a portion of the second leg engages with the shaft to secure the clip to the shaft.

24. The holder of claim 1 wherein no nuts or bolts are required to secure the corrosion coupon to the clip or the shaft.

25. The holder of claim 1 wherein no parts of the holder are required to be removed to release the corrosion coupon from the holder.

26. A method of inserting a corrosion coupon into a holder comprising a shaft; a clip configured to pivot between an open position relative to the shaft to allow insertion and removal of the corrosion coupon and a closed position relative to the shaft to securely hold a first end of the corrosion coupon, the method comprising:

opening the holder by (1) applying a force on a rear end of the clip to cause a forward end of the clip to move away from the shaft, placing the holder in the open position or (b) moving a wedge or lever from a first position in which the clip is held in a closed position to a second position to cause a forward end of the clip to move away from the shaft, placing the holder in the open position;

inserting the corrosion coupon between the clip and the shaft; and closing the holder by (1) releasing the force on the rear end of the clip to cause the forward end of the clip to move toward to the shaft, placing the holder in the closed position or (b) moving the wedge or lever back to the first position, placing the holder in the closed position.

27. The method of claim 26 further comprising one or both of the following steps: (a) aligning an aperture in the first end of the corrosion coupon with an inwardly extending coupon engagement projection disposed on the shaft or the clip; and/or (b) abutting a rear face of the first end of the corrosion coupon to an inwardly extending spacer disposed on the shaft or the clip.

28. The method of claim 26 wherein the holder is used in a coupon rack, the method further comprising:

shutting off a flow of water or other fluid to the coupon rack;

inserting the holder with the corrosion coupon into a pipe in the coupon rack;

tightening any connections between one or more of a nut, socket, tee-coupler and the holder as needed to seal the holder in the coupon rack;

turning on the flow of water or other fluid to the coupon rack for a test cycle period of time.

29. The method of claim 28 further comprising:

shutting off a flow of water or other fluid to the coupon rack at the end of the test cycle;

loosening any connections between one or more of the nut, socket, tee-coupler and the holder as needed to remove the holder in the coupon rack;

removing the holder from the rack;

repeating the opening the holder step;

removing the corrosion coupon from the holder;

inserting a new corrosion coupon between the clip and the shaft; and repeating the closing the holder, tightening, and turning on the flow steps.

30. The method of claim 29 wherein no parts of the holder are required to be removed in the removing the corrosion coupon from the holder step.

31. The method of claim 26 wherein the holder further comprises:

a pin inserted through a portion of the shaft and a portion of the clip to secure the clip to the shaft; and a spring disposed between the shaft and the clip, wherein the spring is in an extended position when the clip is in the closed position and the spring is in a compressed position when the clip is in the open position.

a spacer disposed on an inner surface of a forward portion of the shaft or an inner surface of a forward portion of the clip to form a coupon insertion area between the clip and the shaft;

a coupon engagement projection disposed on one of the inner surface of the forward portion of the shaft or the inner surface of the forward portion of the clip;

a pair of opposed spaced apart lips, one on the forward portion of the shaft and the other on the forward portion of the clip;

a pair of opposed spaced apart shoulders, one on the on the forward portion of the shaft and the other on the forward portion of the clip;

wherein the lips are disposed forwardly of the coupon engagement projection and the shoulders are disposed forwardly of the spacer; and wherein the lips and shoulders are configured to engage with front and rear surfaces of the first end of the corrosion coupon and the coupon engagement projection is configured to engage with an aperture on the first end of the corrosion coupon.

32. The method of claim 26 wherein the wherein the clip comprises a forward portion, a rearward portion, and a pivot body disposed between the forward and rearward portions, wherein the pivot body comprises a first aperture;

wherein the clip holder comprises a first body and a second body spaced apart laterally from each other and forming an opening configured to receive the pivot body;

wherein the first body comprises a second aperture and the second body comprises a third aperture; and wherein the first, second and third apertures are configured to align together and to receive the pin to connect the clip to the shaft.

* * * * *